United States Patent
Iuchi et al.

(10) Patent No.: US 9,798,312 B2
(45) Date of Patent: Oct. 24, 2017

(54) NUMERICAL CONTROL DEVICE

(75) Inventors: Yukihiro Iuchi, Tokyo (JP); Tomonori Sato, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 369 days.

(21) Appl. No.: 14/401,392

(22) PCT Filed: May 15, 2012

(86) PCT No.: PCT/JP2012/062431
§ 371 (c)(1),
(2), (4) Date: Nov. 14, 2014

(87) PCT Pub. No.: WO2013/171850
PCT Pub. Date: Nov. 21, 2013

(65) Prior Publication Data
US 2015/0134100 A1 May 14, 2015

(51) Int. Cl.
G05B 19/18 (2006.01)
G05B 19/4155 (2006.01)

(52) U.S. Cl.
CPC ....... *G05B 19/182* (2013.01); *G05B 19/4155* (2013.01); *G05B 2219/36056* (2013.01);
(Continued)

(58) Field of Classification Search
CPC .. G05B 19/416; G05B 19/19; G05B 19/4155; G05B 19/182; G05B 2219/36056; G05B 2219/43041; G05B 2219/49108
(Continued)

(56) References Cited

U.S. PATENT DOCUMENTS 5,452,202 A 9/1995 Seki et al.
5,793,635 A 8/1998 Niwa
(Continued)

FOREIGN PATENT DOCUMENTS

EP 0593772 A1 4/1994
EP 1048400 A1 11/2000
(Continued)

OTHER PUBLICATIONS

Human translation <JP 62179605>, Hitotsubashi, Masami, Nov. 14, 1987, 9 pages.*
(Continued)

*Primary Examiner* — Sean Shechtman
*Assistant Examiner* — Shon Foley
(74) *Attorney, Agent, or Firm* — Sughrue Mion, PLLC; Richard C. Turner

(57) ABSTRACT

A numerical control device (1) of a machine tool capable of controlling its spindle rotating speed includes: a program analyzing unit (2) that reads ahead a machining program (6) by one block or more and analyzes a command for the machine tool; and a command determining unit (3) that determines, based on a result analyzed by the program analyzing unit (2), whether a command posterior to a spindle control command causes any machining problem when the command is executed during a spindle rotating speed change, outputs a first command, in which some problem occurs in the machining, after the spindle rotating speed reaches the commanded rotating speed, and output a second command, which is other than the first command, before the spindle rotating speed reaches the commanded rotating speed.

4 Claims, 16 Drawing Sheets (1) CONVENTIONAL OPERATION (2) OPERATION IN FIRST EMBODIMENT

(52) U.S. Cl.
CPC ............ *G05B 2219/43041* (2013.01); *G05B 2219/49108* (2013.01)

(58) Field of Classification Search
USPC .................... 700/23, 26, 86, 87, 159–195
See application file for complete search history.

(56) References Cited

U.S. PATENT DOCUMENTS

| | | | |
|---|---|---|---|
| 6,502,007 B1 | 12/2002 | Kanamoto et al. | |
| 6,909,937 B2 * | 6/2005 | Sugiyama | G05B 19/40938 318/568.1 |
| 8,629,641 B2 | 1/2014 | Fujishima et al. | |
| 2002/0138171 A1 * | 9/2002 | Fukutani | B23Q 15/12 700/188 |

FOREIGN PATENT DOCUMENTS

| | | |
|---|---|---|
| JP | 62-179605 U | 11/1987 |
| JP | 02-90302 A | 3/1990 |
| JP | 03-222012 A | 10/1991 |
| JP | 06-282318 A | 10/1994 |
| JP | 07-040187 A | 2/1995 |
| JP | 11-048072 A | 2/1999 |
| JP | 11-202926 A | 7/1999 |
| JP | 11-300577 A | 11/1999 |
| JP | 2003-330517 A | 11/2003 |
| JP | 2007-233624 A | 9/2007 |
| JP | 2009-282829 A | 12/2009 |
| JP | 2010-026920 A | 2/2010 |
| JP | 2010-033150 A | 2/2010 |
| JP | 2011-118952 A | 6/2011 |
| JP | 2011-145825 A | 7/2011 |
| WO | 02/067068 A1 | 8/2002 |

OTHER PUBLICATIONS

Liu, Y. [et al.]: "An intelligent NC program processor for CNC system of machine tool." In: Robotics and Computer-Integrated Manufacturing. 2007, vol. 23 (2)—ISSN 1879-2537 (E); 0736-5845 (P) Abstract Only.
Communication dated Nov. 25, 2015 from the German Patent and Trademark Office in counterpart application No. 112012006379.1.
Notice of Rejection for Japanese Patent Application No. 2013-514435 dated Jul. 30, 2013.
Notice of Rejection for Japanese Patent Application No. 2013-514435 dated Nov. 5, 2013.
Examination Report for Taiwanese Patent Application No. 101143207 dated Sep. 4, 2014.
International Search Report for PCT/JP2012/062431 dated Sep. 11, 2012.

* cited by examiner

FIG.4

| | | |
|---|---|---|
| N101 | G1 X10. | (CUTTING COMMAND) |
| N102 | G0 Z10. | (POSITIONING COMMAND) |
| N103 | M5 | (SPINDLE STOPPING COMMAND) |
| N104 | G30 Z | (RETURN TO TOOL REPLACING POSITION) |
| N105 | T1 M6 | (TOOL REPLACING COMMAND) |
| N106 | G54 X0. Y0. | (POSITIONING COMMAND) |
| N107 | G43 H1 Z50. | (POSITIONING COMMAND) |
| N108 | M3 S1000 | (SPINDLE ROTATING COMMAND) |
| N109 | G0 X10. Y10. | (POSITIONING COMMAND) |
| N110 | G0 Z1. | (POSITIONING COMMAND) |
| N111 | G1 Z0. F1000 | (CUTTING COMMAND) |

FIG.5
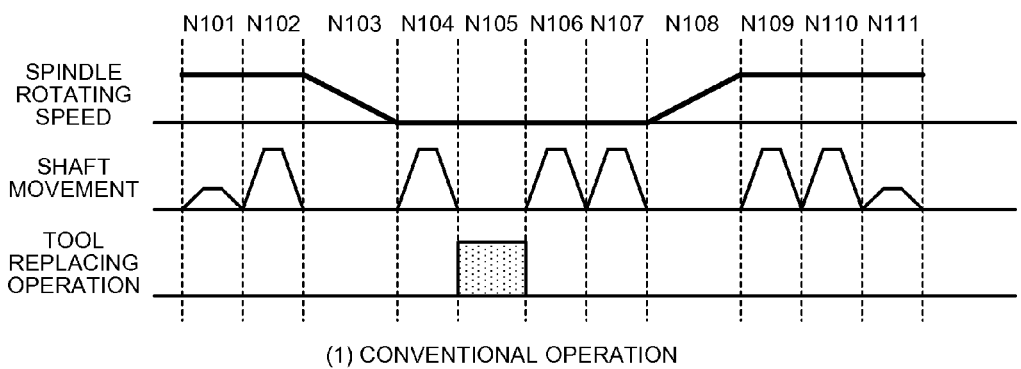
(1) CONVENTIONAL OPERATION
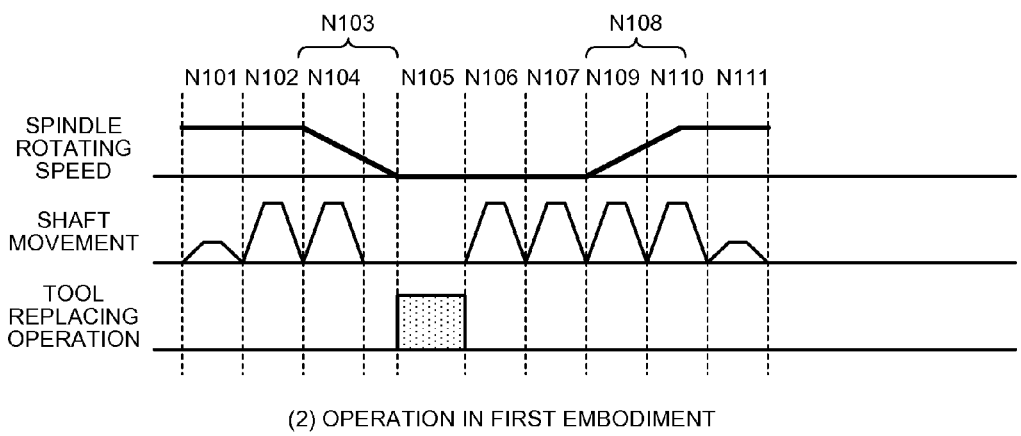
(2) OPERATION IN FIRST EMBODIMENT

FIG.8

|      |              |                          |
|------|--------------|--------------------------|
|      | ⋮            |                          |
| N201 | T1 M6        | (TOOL REPLACING COMMAND) |
| N202 | G54 X0. Y0.  | (POSITIONING COMMAND)    |
| N203 | G43 H1 Z50.  | (POSITIONING COMMAND)    |
| N204 | M3 S1000     | (SPINDLE ROTATING COMMAND) |
| N205 | G0 X10. Y10. | (POSITIONING COMMAND)    |
| N206 | G0 Z5.       | (POSITIONING COMMAND)    |
| N207 | G0 Z1.       | (POSITIONING COMMAND)    |
| N208 | G1 Z0. F1000 | (CUTTING COMMAND)        |
|      | ⋮            |                          |

FIG.9
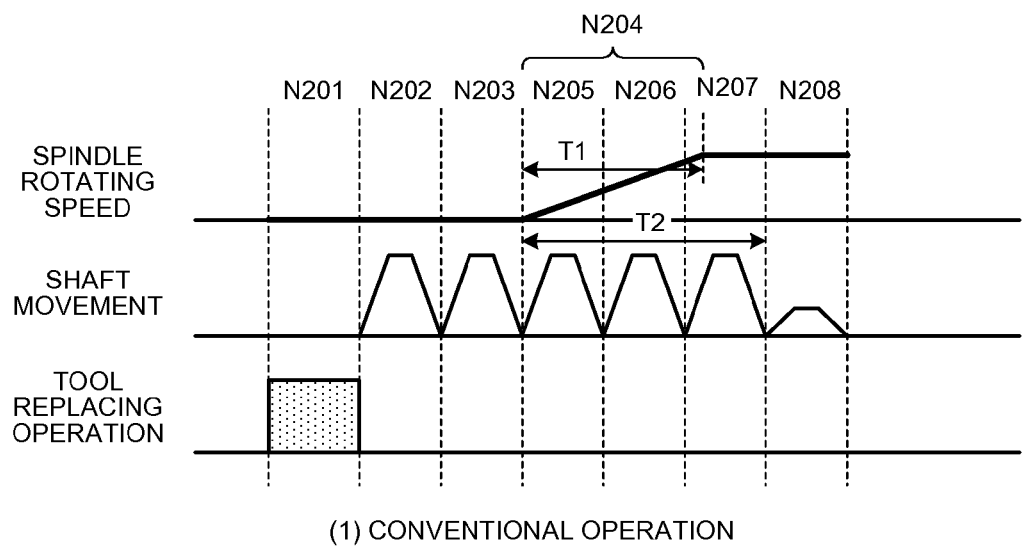
(1) CONVENTIONAL OPERATION
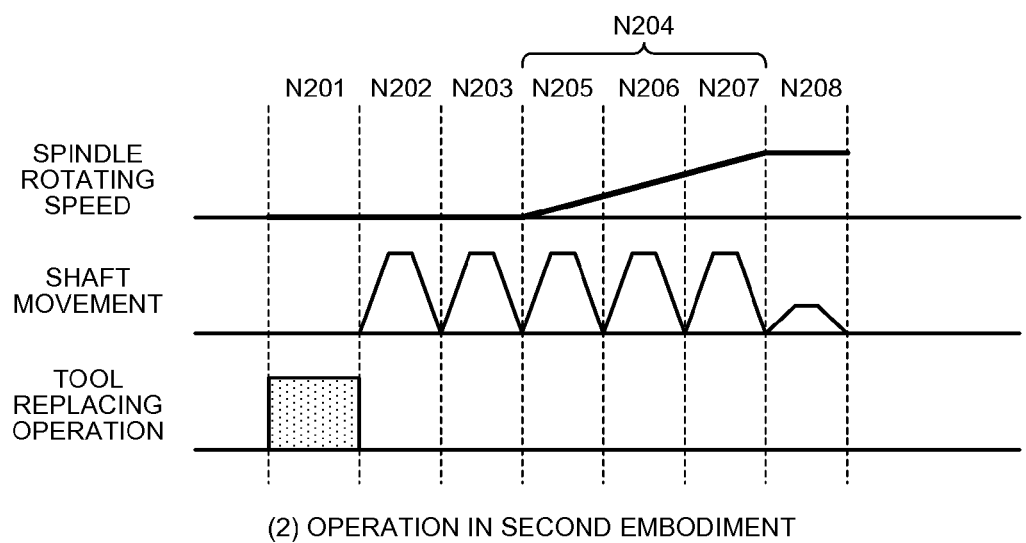
(2) OPERATION IN SECOND EMBODIMENT

FIG.11
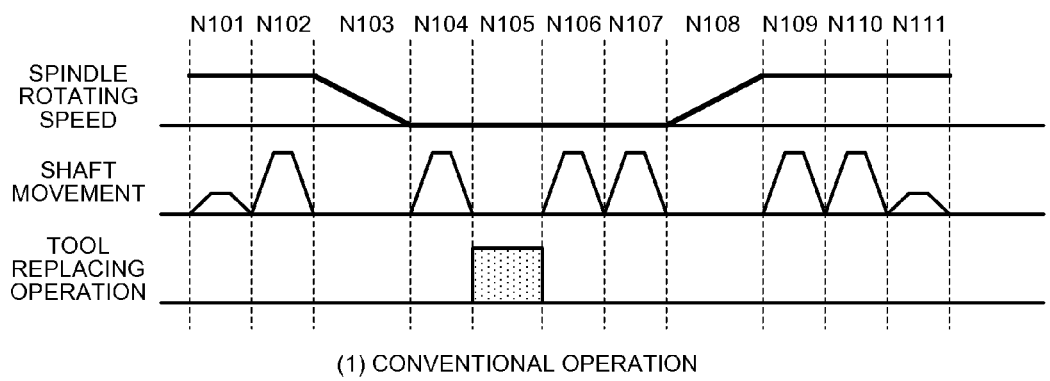
(1) CONVENTIONAL OPERATION
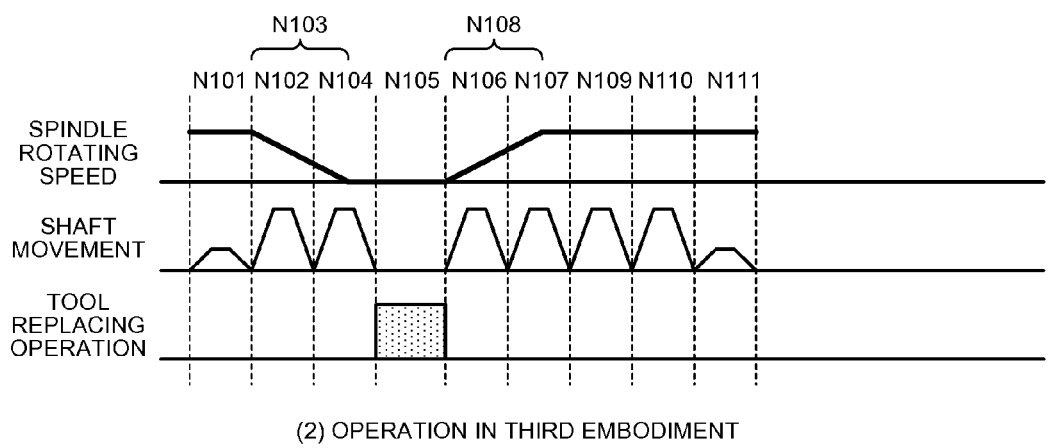
(2) OPERATION IN THIRD EMBODIMENT

FIG.14

```
        ⋮
N301  T1 M6            (TOOL REPLACING COMMAND)
N302  G54 X0. Y0.      (POSITIONING COMMAND)
N303  G43 H1 Z50.      (POSITIONING COMMAND)
N304  M3 S2000         (SPINDLE ROTATING COMMAND)
N305  G0 X10. Y10.     (POSITIONING COMMAND)
N306  G0 Z1.           (POSITIONING COMMAND)
N307  G1 Z0. F1000     (CUTTING COMMAND)
        ⋮
```

FIG.15
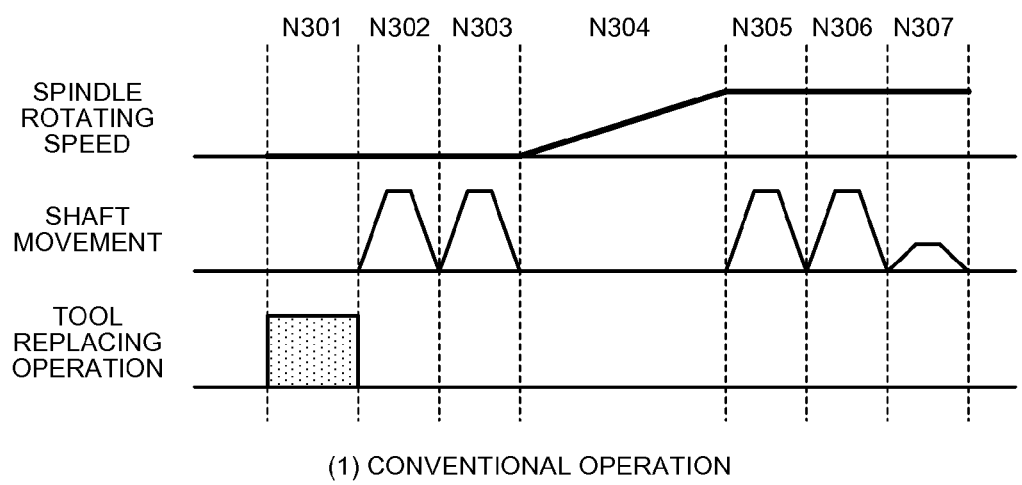
(1) CONVENTIONAL OPERATION
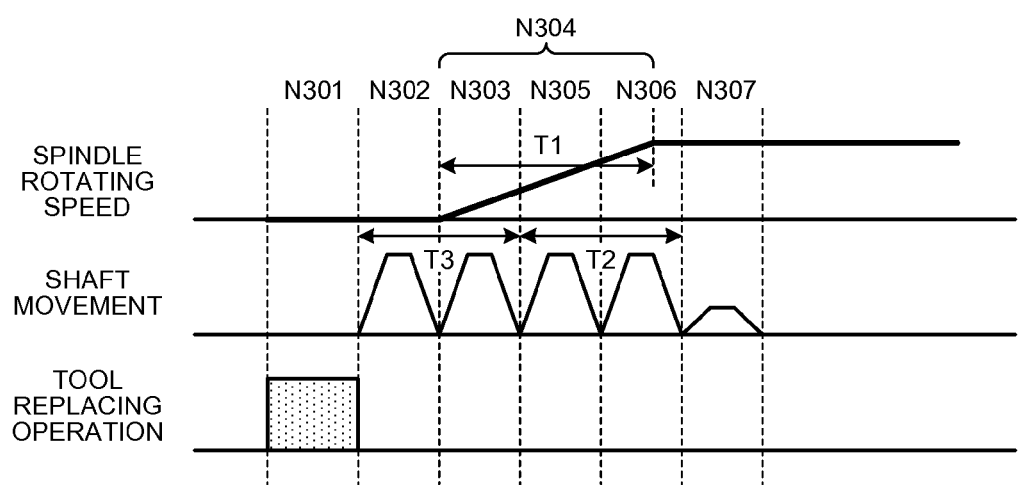
(2) OPERATION IN FOURTH EMBODIMENT FIG.16
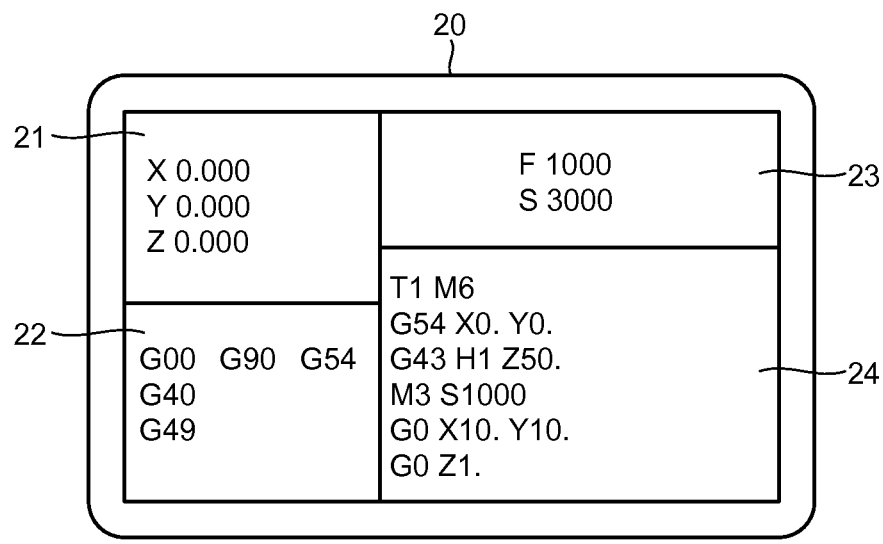
(1) CONVENTIONAL SCREEN DISPLAY
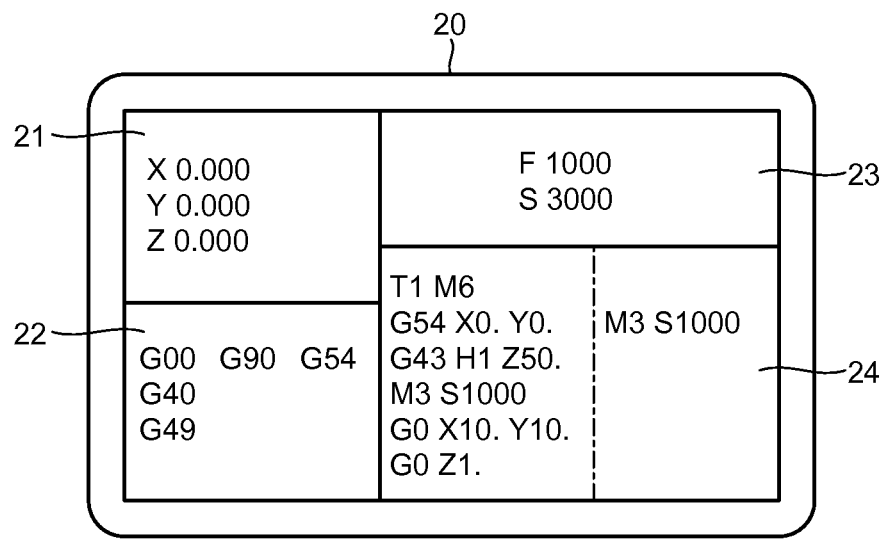
(2) SCREEN DISPLAY AT TIME OF SPINDLE
CONTROL COMMAND OUTPUT TIMING CHANGE

NUMERICAL CONTROL DEVICE

CROSS REFERENCE TO RELATED APPLICATIONS

This application is a National Stage of International Application No. PCT/JP2012/062431 filed May 15, 2012, the contents of all of which are incorporated herein by reference in their entirety.

FIELD

The present invention relates to a numerical control device that performs numerical control (NC) of a machine tool capable of controlling its spindle rotating speed.

BACKGROUND

In a machine tool equipped with a numerical control device, machining is performed by commanding spindle rotating speed from a machining program. In the machine tool, machining cannot be performed during the period from the commanding of the spindle rotating speed until actual spindle rotating speed reaches the commanded rotating speed. Therefore, a waiting time occurs and a machining time becomes long. However, with such a numerical control device, it is unnecessary for every command to wait for the spindle rotating speed to reach commanded rotating speeds. For example, in the case of a cutting command, it is necessary to wait for the spindle rotating speed to reach a commanded rotating speed. However, in the case of the non-cutting command such as a positioning command, it is unnecessary to wait for the spindle rotating speed to reach rotating speed commanded. The determination for each command as to whether to wait or not can be done by making a ladder. However, because the ladder is complicated, it is not easy for an operator to modify the ladder.

For example, Patent Literature 1 discloses a technology that uses a machining program in a control device to command and select whether the next block is executed after waiting for spindle rotating speed to reach commanded rotating speed or whether the next block is executed even if the spindle rotating speed has not reached the commanded rotating speed.

Patent Literature 2 discloses a technology used in a numerical control device to control the timing of the output of a spindle rotating command such that the spindle rotating speed reaches commanded rotating speed according to a timing when a cutting command is started.

CITATION LIST

Patent Literature

Patent Literature 1: Japanese Utility Model Publication No. S62-179605
Patent Literature 2: Japanese Patent Application Laid-Open No. 2011-118952

SUMMARY

Technical Problem

However, in the technology described in Patent Literature 1, there is a problem in that, when the control device commands to execute the next block after waiting for the spindle rotating speed to reach the commanded rotating speed, a machining time increases because the next block is executed after waiting for the spindle rotating speed to reach the commanded rotating speed even in a case of a non-cutting command such as a positioning command. In other case, there is a problem in that, when the control device commands the machine tool to execute the next block even if the spindle rotating speed does not reach the commanded rotating speed, the next block is executed even if the spindle rotating speed does not reach the commanded rotating speed even in a case of a cutting command, resulting in the deterioration of the machining accuracy.

In the technology described in Patent Literature 2, the control in the numerical control device is performed for the purpose of preventing a spindle from wastefully rotating to save power consumption. Therefore, there is a problem in that output timing of the spindle rotating command is output only later than the timing commanded by the machining program so that a machining time cannot be reduced.

The present invention has been made in view of the above and it is an object of the present invention to obtain a numerical control device capable of reducing a machining time in a machine tool without deteriorating machining accuracy.

Solution to Problem

To solve the problem and achieve the object mentioned above, the present invention relates to a numerical control device of a machine tool capable of controlling its spindle rotating speed. The numerical control device includes: a program analyzing unit that reads ahead a machining program by one block or more and analyzes a command for the machine tool; and a command determining unit that determines, based on a result analyzed by the program analyzing unit, whether a command posterior to a spindle control command causes any machining problem when the command is executed during a spindle rotating speed change, outputs a first command, in which some problem occurs in the machining, after the spindle rotating speed reaches commanded rotating speed, and outputs a second command, which is other than the first command, before the spindle rotating speed reaches the commanded rotating speed.

Advantageous Effects of Invention

The numerical control device according to the present invention attains an effect such that it is possible to reduce a machining time in a machine tool without deteriorating machining accuracy.

BRIEF DESCRIPTION OF DRAWINGS

FIG. 4 is a diagram illustrating a machining program example processed by the numerical control device in the first embodiment.

FIG. 5 is a time chart for the machining program example shown in FIG. 4.

FIG. 8 is a diagram illustrating a machining program example processed by the numerical control device in the second embodiment.

FIG. 9 is a time chart for the machining program example shown in FIG. 8.

FIG. 11 is a time chart for the machining program example shown in FIG. 4.

FIG. 14 is a diagram illustrating a machining program example processed by the numerical control device in the fourth embodiment.

FIG. 15 is a time chart for the machining program example shown in FIG. 14.

FIG. 16 is a diagram illustrating an example of a display screen in a display unit included in the numerical control device.

DESCRIPTION OF EMBODIMENTS

Embodiments of a numerical control device according to the present invention are explained in detail below with reference to the drawings. Note that the present invention is not limited to these embodiments.

First Embodiment

Figure 1:
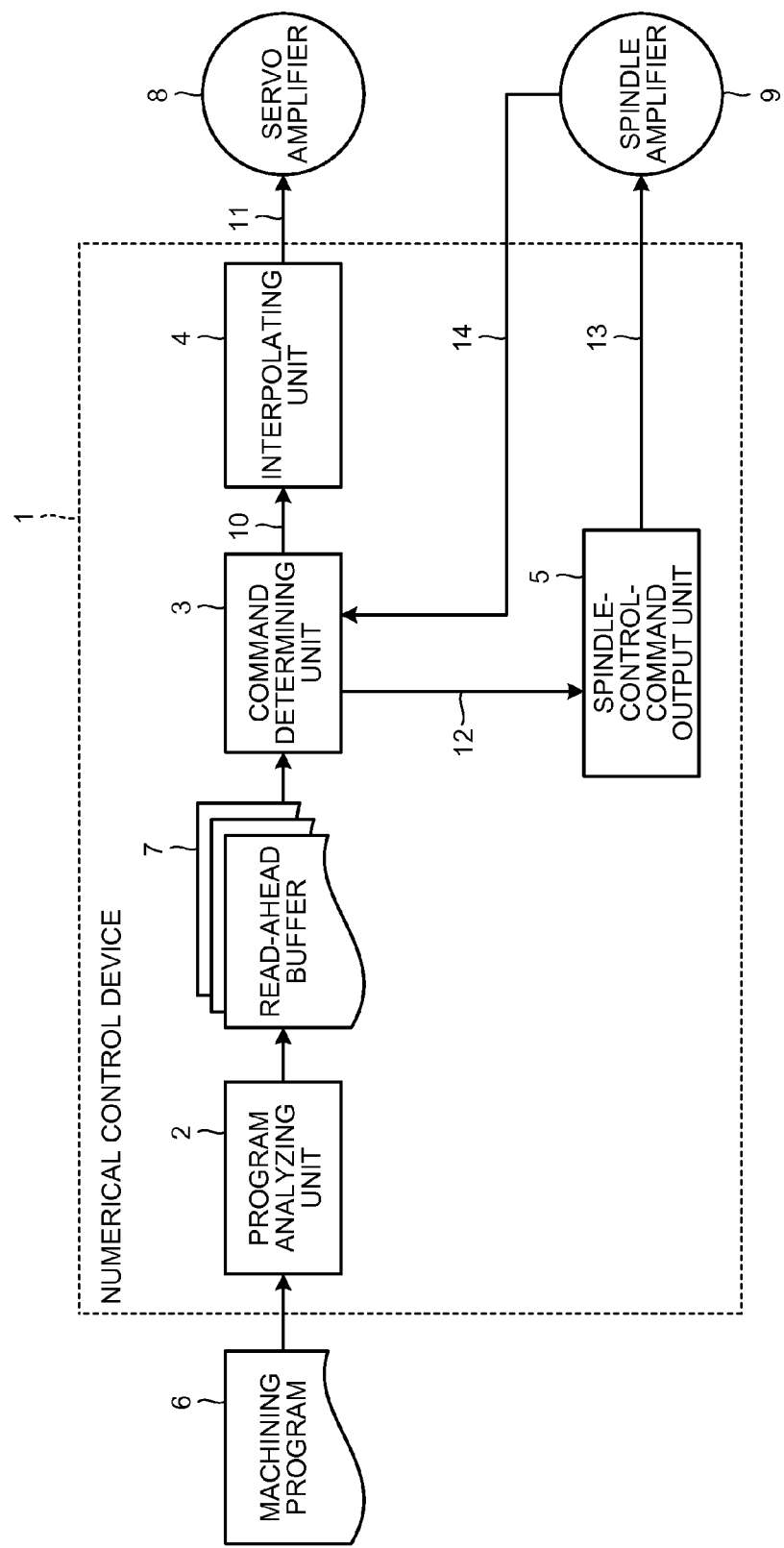
FIG. 1 is a diagram illustrating a configuration example of a numerical control device.

FIG. 1 is a diagram illustrating a configuration example of a numerical control device according to the embodiment. In FIG. 1, reference numeral 1 denotes a numerical control device. Reference numeral 2 denotes a program analyzing unit, 3 denotes a command determining unit, 4 denotes an interpolating unit, 5 denotes a spindle-control-command output unit, 6 denotes a machining program, 7 denotes a read-ahead buffer, 8 denotes a servo amplifier, 9 denotes a spindle amplifier, 10 denotes a moving command, 11 denotes a movement amount, 12 denotes a spindle control command, 13 denotes a spindle rotating speed, and 14 denotes an actual spindle rotating speed.

The program analyzing unit 2 reads and analyzes the machining program 6 and sequentially stores analysis results of read commands. In the read-ahead buffer 7, stored is information such as modals of blocks, movement amounts of shafts, and spindle rotating speed, which are analysis results in the program analyzing unit 2. The information stored in the read-ahead buffer 7 is deleted when a commanded operation is completed. The command determining unit 3 reads the information concerning the blocks stored in the read-ahead buffer 7 ahead and outputs commands to processing units corresponding to the commands. The moving command 10 is output to the interpolating unit 4. The interpolating unit 4 calculates the movement amount 11 at every interpolation cycle and outputs the movement amount 11 to the servo amplifier 8. The moving command 10 is a command for controlling the operations of a shaft such as a cutting command and a positioning command. The commands are collectively referred to as moving command 10. The spindle control command 12 is output to the spindle-control-command output unit 5. The spindle-control-command output unit 5 outputs the spindle rotating speed 13 to the spindle amplifier 9. The spindle control command 12 is a command for controlling the operations of a spindle such as a spindle rotating command and a spindle stopping command. The commands are collectively referred to as spindle control command 12. The spindle amplifier 9 outputs the actual spindle rotating speed 14 to the command determining unit 3. The command determining unit 3 uses the actual spindle rotating speed 14 for determining the output of a command.

Figure 2:
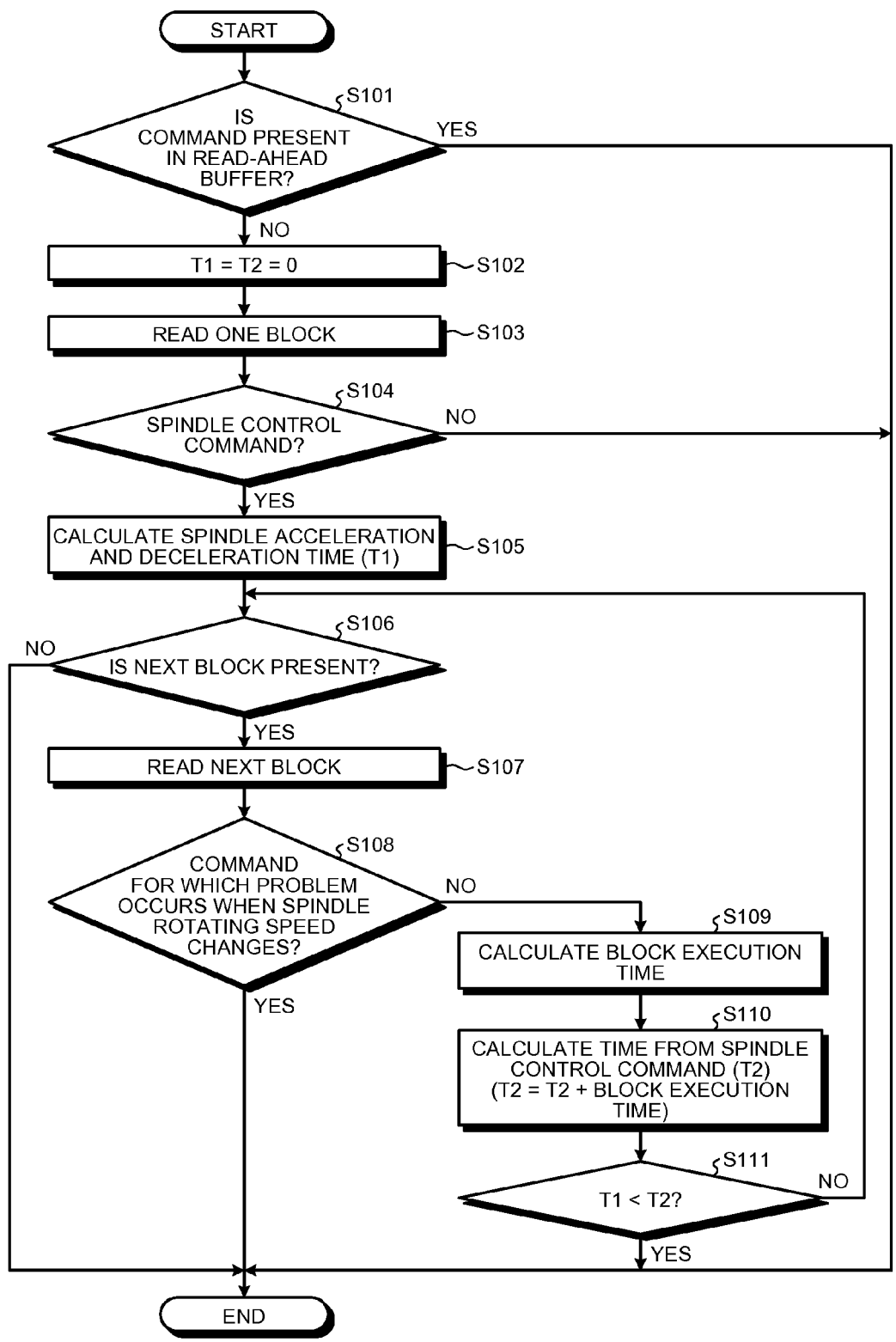
FIG. 2 is a flowchart illustrating a processing procedure executed by a program analyzing unit of the numerical control device according to a first embodiment.

FIG. 2 is a flowchart illustrating a processing procedure executed by the program analyzing unit 2 of the numerical control device 1 according to the embodiment. At step S101, the program analyzing unit 2 determines whether a command is stored in the read-ahead buffer 7. If a command is stored in the read-ahead buffer 7 (Yes at step S101), the program analyzing unit 2 ends the processing. If a command is not stored in the read-ahead buffer 7 (No at step S101), the program analyzing unit 2 proceeds to step S102. At step S102, the program analyzing unit 2 clears and sets a spindle acceleration and deceleration time T1 and time T2 from a spindle control command to 0 and proceeds to step S103. At step S103, the program analyzing unit 2 reads the machining program 6 and proceeds to step S104. At step S104, the program analyzing unit 2 determines whether the read command is the spindle control command 12. If the read command is the spindle control command 12 (Yes at step S104), the program analyzing unit 2 proceeds to step S105. If the read command is not the spindle control command 12 (No at step S104), the program analyzing unit 2 ends the processing. At step S105, the program analyzing unit 2 calculates the spindle acceleration and deceleration time T1 on the basis of a method for calculating the execution time of blocks explained below and proceeds to step S106. At step S106, the program analyzing unit 2 determines whether the next block is present. If the next block is present (Yes at step S106), the program analyzing unit 2 proceeds to step S107. If the next block is not present (No at step S106), the program analyzing unit 2 ends the processing. At step S107, the program analyzing unit 2 reads the next block and proceeds to step S108. At step S108, the program analyzing unit 2 determines whether the read command is a command for which a problem occurs when spindle rotating speed changes. If the read command is a command for which a problem does not occur (No at step S108), the program analyzing unit 2 proceeds to step S109. If the read command is a command for which a problem occurs (Yes at step S108), the program analyzing unit 2 ends the processing. At step S109, the program analyzing unit 2 calculates an execution time of the read command on the basis of a method for calculating the execution times of blocks explained below and proceeds to step S110. At step S110, the program analyzing unit 2 accumulates execution times calculated at step S109 in order to calculate the time T2 from the spindle control command and proceeds to step S111. At step S111, the program analyzing unit 2 compares the spindle acceleration and deceleration time T1 with the time T2 from the spindle control command. If the program analyzing unit 2 determines that the spindle acceleration and deceleration time T1 is larger (No at step S111), the program analyzing unit 2 returns to step S106. If the program analyzing unit 2 determines that the time T2 from the spindle control command is larger (Yes at step S111), the program analyzing unit 2 ends the processing. Note that information concerning the blocks read by the program analyzing unit 2 is sequentially stored in the read-ahead buffer 7.

Here, a method is explained of determining a command for which a problem occurs when the spindle rotating speed changes. Examples of a command for which a problem occurs when the spindle rotating speed changes include a tool replacing command and a cutting command. The tool replacing command is usually performed in a situation in which the spindle is stopped so that the spindle cannot be rotated. The cutting command is performed in a state in which work is being machined so that accuracy of the machining deteriorates when the spindle rotating speed changes. That is, as a command posterior to the spindle rotating command, the command for which a problem occurs when the spindle rotating speed changes is the cutting command. As a command prior to the spindle rotating command, the command for which a problem occurs when the spindle rotating speed changes is the cutting command and the tool replacing command. As a command posterior to the spindle stopping command, the command for which a problem occurs when the spindle rotating speed changes is the tool replacing command. As a command prior to the spindle stopping command, the command for which a problem occurs when the spindle rotating speed changes is the cutting command. Here, a command other than the tool replacing command and the cutting command for which a problem occurs when the spindle rotating speed changes is determined by setting the command in parameters or the like in advance. The command for which a problem occurs when the spindle rotating speed changes, i.e., a command in which some problem (e.g., an increase in a machining time or deterioration in machining accuracy) occurs in machining because of implementation during the spindle rotating speed change is here referred to as a first command. A command for which a problem does not occur even if the spindle rotating speed changes, i.e., a command other than the first command in which some problem occurs in machining is referred to as a second command.

A method for calculating the execution times of blocks in the program analyzing unit 2 is explained here. In the case of the positioning command, an execution time is calculated from quick feed speed and an acceleration and deceleration time constant set in parameters in advance and a moving distance commanded by the machining program 6 (execution time=moving distance/quick feed speed+acceleration and deceleration time constant). In the case of an M code, an execution time is set in parameters in advance. In the case of the spindle control command 12, an execution time is calculated from the maximum rotating speed and an acceleration and deceleration time constant of the spindle set in advance, spindle rotating speed commanded by the machining program 6, and the present spindle rotating speed (execution time=(|commanded spindle rotating speed−present spindle rotating speed|)×acceleration and deceleration time constant of the spindle/maximum rotating speed).

Figure 3:
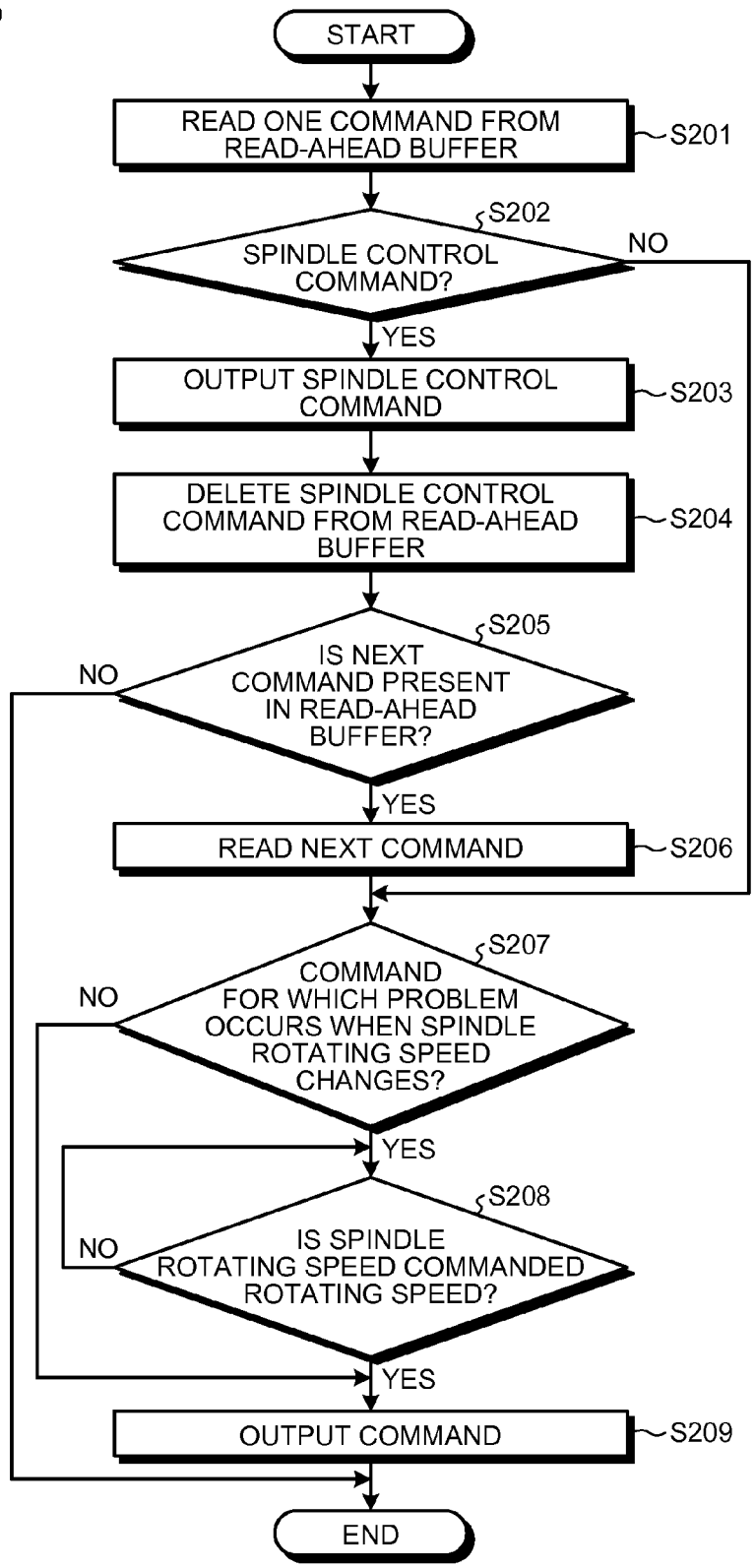
FIG. 3 is a flowchart illustrating a processing procedure executed by a command determining unit of the numerical control device according to the first embodiment.

FIG. 3 is a flowchart illustrating a processing procedure executed by a command determining unit 3 of the numerical control device 1 according to the embodiment. The command determining unit 3 sequentially performs processing on the basis of the information concerning the commands analyzed by the program analyzing unit 2 and stored in the read-ahead buffer 7. At step S201, the command determining unit 3 reads one command from the read-ahead buffer 7 and proceeds to step S202. At step S202, the command determining unit 3 determines whether the read command is the spindle control command 12. If the read command is the spindle control command 12 (Yes at step S202), the command determining unit 3 proceeds to step S203. If the read command is not the spindle control command 12 (No at step S202), the command determining unit 3 proceeds to step S207. At step S203, the command determining unit 3 outputs the spindle control command 12, which is the read command, and proceeds to step S204. At step S204, the command determining unit 3 deletes the spindle control command 12, which is the read command, from the read-ahead buffer 7 and proceeds to step S205. At step S205, the command determining unit 3 determines whether the next command is stored in the read-ahead buffer 7. If the next command is stored in the read-ahead buffer 7 (Yes at step S205), the command determining unit 3 proceeds to step S206. If the next command is not stored in the read-ahead buffer 7 (No at step S205), the command determining unit 3 ends the processing. At step S206, the command determining unit 3 reads the next command from the read-ahead buffer 7 and proceeds to step S207. At step S207, the command determining unit 3 determines whether the read command is a command for which a problem occurs when the spindle rotating speed changes. If the read command is the command for which a problem occurs (Yes at step S207), the command determining unit 3 proceeds to step S208. When the read command is a command for which a problem does not occur (No at step 207), the command determining unit 3 proceeds to step S209. At step S208, the command determining unit 3 determines whether the actual spindle rotating speed 14 reaches the commanded rotating speed. If the actual spindle rotating speed 14 does not reach the commanded rotating speed (No at step S208), the command determining unit 3 waits for the actual spindle rotating speed 14 to reach the commanded rotating speed (Yes at step S208) and proceeds to step S209. At step S209, the command determining unit 3 outputs the read command and ends the processing.

Note that, if the read command is the moving command such as a cutting command or a positioning command, the command determining unit 3 outputs the read command to the interpolating unit 4. The interpolating unit 4 calculates the movement amount 11 at every interpolation cycle and outputs the movement amount 11 to the servo amplifier 8. On the other hand, if the read command is the spindle control command 12 such as a spindle rotating command or a spindle stopping command, the command determining unit 3 outputs the read command to the spindle-control-command output unit 5. The spindle-control-command output unit 5 outputs the spindle rotating speed 13 to the spindle amplifier 9. Although not shown in the figure, commands other than the moving command 10 and the spindle control commands 12 are processed by the processing units corresponding to such commands. The processing is the same as the conventional processing.

A flow of processing in the numerical control device 1 is specifically explained according to the flowcharts of FIG. 2 and FIG. 3 with reference to a machining program example. FIG. 4 is a diagram illustrating the machining program example processed by the numerical control device 1 in the embodiment. First, at step S101, the program analyzing unit 2 confirms that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N101. Because the block of N101 is a cutting command (No at step S104), the program analyzing unit 2 ends the processing. In this case, a command of N101 is stored in the read-ahead buffer 7.

At step S201, the command determining unit 3 reads the command of N101 stored in the read-ahead buffer 7. Because the command of N101 is the cutting command (No at step S202), the command determining unit 3 proceeds to step S207: Yes, step S208: Yes, and step S209, outputs the cutting command, and ends the processing.

When the operation of the cutting command of N101 is completed, at step S101, the program analyzing unit 2 confirms that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N102. Because the block of N102 is a positioning command (No at step S104), the program analyzing unit 2 ends the processing. Then, a command of N102 is stored in the read-ahead buffer 7.

At step S201, the command determining unit 3 reads the command of N102 stored in the read-ahead buffer 7. Because the command of N102 is the positioning command (No at step S202), the command determining unit 3 proceeds to step S207: No and step S209, outputs the positioning command, and ends the processing.

When the operation of the positioning command of N102 is completed, the program analyzing unit 2 confirms at step S101 that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N103. Because the block of N103 is a spindle stopping command (Yes at step S104), the program analyzing unit 2 proceeds to step S104, calculates the spindle acceleration and deceleration time T1 that is a time period until the spindle rotating speed reaches the commanded rotating speed, and proceeds to step S106. At step S106, the program analyzing unit 2 confirms that the next block is present (Yes at step S106). At step S107, the program analyzing unit 2 reads a block of N104, which is the next block. Because the block of N104 is a positioning command to return to a tool replacement position (No at step S108), the program analyzing unit 2 proceeds to step S109 and calculates an execution time of the block of N104. At step S110, the program analyzing unit 2 updates the time T2 from the spindle control command. At step S111, the program analyzing unit 2 compares the spindle acceleration and deceleration time T1 with the time T2 from the spindle control command. The program analyzing unit 2, if the spindle acceleration and deceleration time T1 is larger (No at step S111), returns to step S106.

At step S106, the program analyzing unit 2 confirms that the next block is present (Yes at step S106). At step S107, the program analyzing unit 2 reads a block of N105, which is the next block. The program analyzing unit 2 proceeds to step S108. Because the block of N105 is a tool replacing command (Yes at step S108), the program analyzing unit 2 ends the processing. Here, commands of N103, N104, and N105 are stored in the read-ahead buffer 7.

At step S201, the command determining unit 3 reads the command of N103 stored in the read-ahead buffer 7. Because the command of N103 is a spindle stopping command (Yes at step S202), the command determining unit 3 proceeds to step S203 and step S204, outputs the spindle stopping command, and deletes the spindle stopping command from the read-ahead buffer 7. At step S205, the command determining unit 3 confirms that the next command is present in the read-ahead buffer 7 (Yes at step S205). At step S206, the command determining unit 3 reads the command of N104. Because the command of N104 is a positioning command to return to a tool replacement position (No at step S207), the command determining unit 3 proceeds to step S209, outputs the positioning command to return to a tool replacement position, and ends the processing.

When the operation of the positioning command to return to a tool replacement position of N104 is completed, because a command is still stored in the read-ahead buffer 7 at step S101 (Yes at step S101), the program analyzing unit 2 ends the processing.

At step S201, the command determining unit 3 reads the command of N105 stored in the read-ahead buffer 7. Because the command of N105 is a tool replacing command (No at step S202), the command determining unit 3 proceeds to step S207: Yes, step S208: Yes, and step S209, waits for the actual spindle rotating speed 14 to reach the commanded rotating speed, that is, zero speed, outputs the tool replacing command, and ends the processing.

When the operation of the tool replacing command of N105 is completed, the program analyzing unit 2 confirms at step S101 that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N106. Because the block of N106 is a positioning command (No at step S104), the program analyzing unit 2 ends the processing. In this case, a command of N106 is stored in the read-ahead buffer 7.

At step S201, the command determining unit 3 reads the command of N106 stored in the read-ahead buffer 7. Because the command of N106 is a positioning command (No at step S202), the command determining unit 3 proceeds to step S207: No and step S209, outputs the positioning command, and ends the processing.

Because the next block of N107 is also the positioning command, the program analyzing unit 2 and the command determining unit 3 perform processing that is the same as the processing for the block of N106.

When the operation of the positioning command of N107 is completed, at step S101, the program analyzing unit 2 confirms that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N108. Because the block of N108 is a spindle rotating command (Yes at step S104), the program analyzing unit 2 proceeds to step S105, calculates the spindle acceleration and deceleration time T1, and proceeds to step S106. At step S106, the program analyzing unit 2 confirms that the next block is present (Yes at step S106). At step S107, the program analyzing unit 2 reads a block of N109, which is the next block. Because the block of N109 is a positioning command (No at step S108), the program analyzing unit 2 proceeds to step S109 and calculates an execution time of the block of N109. At step S110, the program analyzing unit 2 updates the time T2 from the spindle control command. At step S111, the program analyzing unit 2 compares the spindle acceleration and deceleration time T1 with the time T2 from the spindle control command. The program analyzing unit 2 determines that the spindle acceleration and deceleration time T1 is larger (No at step S111) and returns to step S106.

At step S106, the program analyzing unit 2 confirms that the next block is present (Yes at step S106). At step S107, the program analyzing unit 2 reads a block of N110, which is the next block. Because the block of N110 is a positioning command (No at step S108), the program analyzing unit 2 proceeds to step S109 and calculates an execution time of the block of N110. At step S110, the program analyzing unit 2 updates the time T2 from the spindle control command. At step S111, the program analyzing unit 2 compares the spindle acceleration and deceleration time T1 with the time T2 from the spindle control command. If the program analyzing unit 2 determines that the time T2 from the spindle control command is larger (Yes at step S111), the program analyzing unit 2 ends the processing. In this case, commands of N108, N109, and N110 are stored in the read-ahead buffer 7.

At step S201, the command determining unit 3 reads the command of N108 stored in the read-ahead buffer 7. Because the command of N108 is a spindle rotating command (Yes at step S202), the command determining unit 3 proceeds to step S203 and step S204, outputs the spindle rotating command, and deletes the spindle rotating command from the read-ahead buffer 7. At step S205, the command determining unit 3 confirms that the next command is present in the read-ahead buffer 7 (Yes at step S205). At step S206, the command determining unit 3 reads the command of N109. Because the command of N109 is a positioning command (No at step S207), the command determining unit 3 proceeds to step S209, outputs the positioning command, and ends the processing.

When the operation of the positioning command of N109 is completed, at step S101, because a command is still stored in the read-ahead buffer 7 (Yes at step S101), the program analyzing unit 2 ends the processing.

At step S201, the command determining unit 3 reads the command of N110 stored in the read-ahead buffer 7. Because the command of N110 is a positioning command (No at step S202), the command determining unit 3 proceeds to step S207: No and step S209, outputs the positioning command, and ends the processing.

When the operation of the positioning command of N110 is completed, at step S101, the program analyzing unit 2 confirms that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N111. Because the block of N111 is a cutting command (No at step S104), the program analyzing unit 2 ends the processing. In this case, a command of N111 is stored in the read-ahead buffer 7.

At step S201, the command determining unit 3 reads the command of N111 stored in the read-ahead buffer 7. Because the command of N111 is a cutting command (No at step S202), the command determining unit 3 proceeds to step S207: Yes, step S208: Yes, and step S209, waits for the actual spindle rotating speed 14 to reach the commanded rotating speed, outputs the cutting command, and ends the processing.

FIG. 5 is a time chart for the machining program example shown in FIG. 4. FIG. 5(1) shows a conventional operation. FIG. 5(2) shows an operation in the embodiment. The figures respectively show relations among spindle rotating speed, a shaft movement amount, and presence or absence of a tool replacing operation at the respective steps. In the conventional operation, it is determined according to a ladder whether the spindle rotating speed has reached the commanded rotating speed and then the operation proceeds to the next block. If the spindle rotating speed reaches the commanded rotating speed and then the operation proceeds to the next block, as shown in FIG. 5(1), the positioning commands of N104, N109, and N110 are executed after the spindle rotating speed reaches the commanded rotating speed. In contrast, in the operation in the embodiment, as shown in FIG. 5(2), the positioning commands of N104, N109, and N110 are executed without depending on the ladder even if the spindle rotating speed does not reach the commanded rotating speed. The tool replacing command of N105 and the cutting command of N111 are executed after the spindle rotating speed reaches the commanded rotating speed. Therefore, it is possible to reduce a machining time even if a complicated ladder is not configured. The read-ahead in the program analyzing unit 2 ends in a case when a command for which a problem occurs when the spindle rotating speed changes is output or in a case when the time period from the spindle control command to the command for which a problem occurs when the spindle rotating speed changes is larger than the time period until the spindle rotating speed reaches the commanded rotating speed. Therefore, it is possible to reduce an increase in a processing load in the numerical control device 1.

As explained above, according to the embodiment, in the case of the command for which a problem occurs when the spindle rotating speed changes, the numerical control device 1 outputs the command posterior to the spindle rotating speed reaches the commanded rotating speed; and in the case of a command other than the command for which a problem occurs when the spindle rotating speed changes, the numerical control device 1 outputs the command even if the spindle rotating speed does not reach the commanded rotating speed. Due to the operation mentioned above, it is possible to reduce a machining time without making a complicated ladder and without affecting machining accuracy and a machine.

The program analyzing unit 2 can appropriately determine the number of blocks to be read ahead and can reduce an increase in a processing load of the numerical control device.

Second Embodiment

Figure 6:
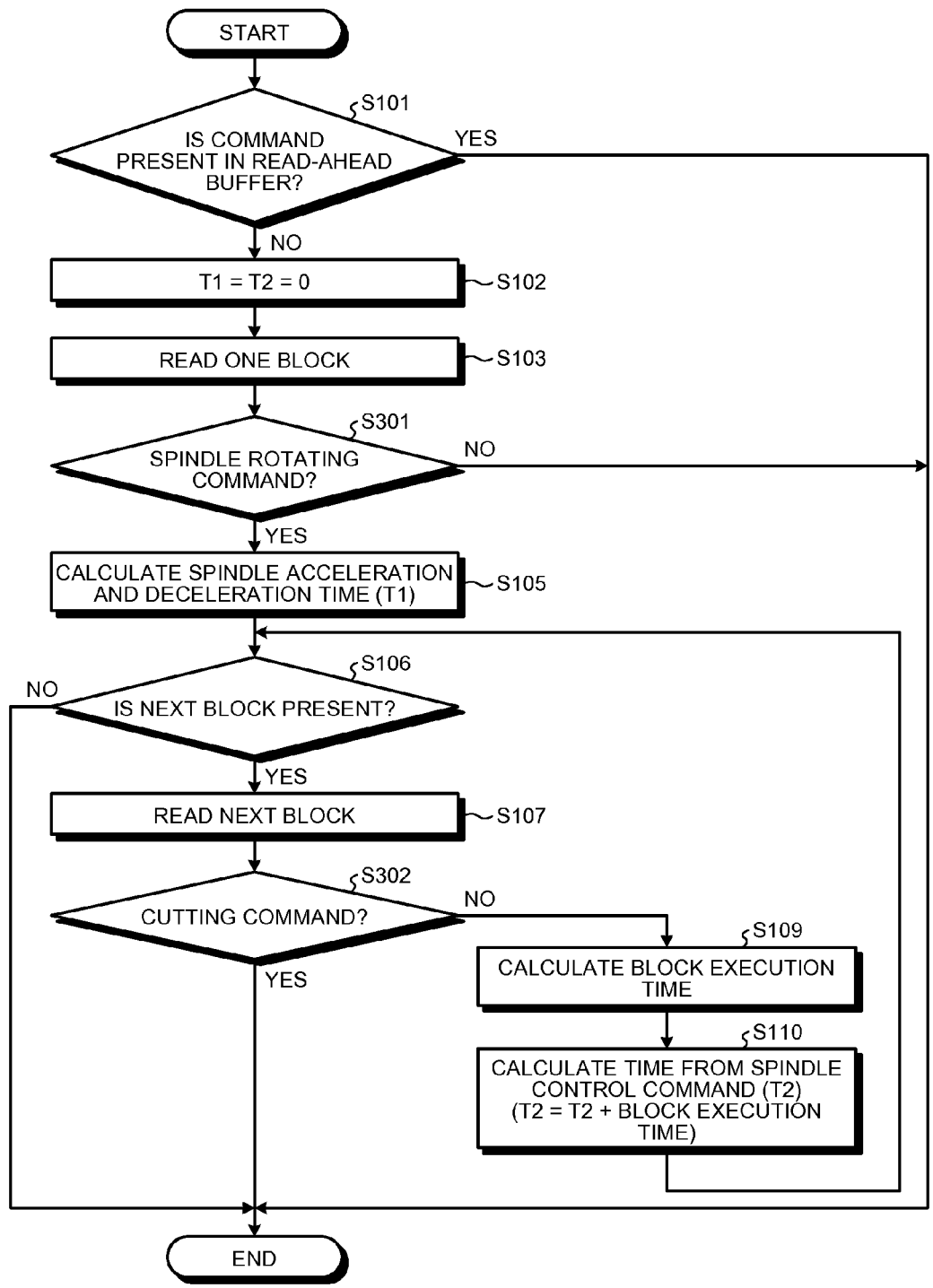
FIG. 6 is a flowchart illustrating a processing procedure executed by a program analyzing unit of a numerical control device according to a second embodiment.

FIG. 6 is a flowchart illustrating a processing procedure executed by the program analyzing unit 2 of the numerical control device 1 according to an embodiment. The flowchart of FIG. 6 is basically the same as the flowchart of FIG. 2 explained above. Therefore, differences therebetween are chiefly explained. Step S101, step S102, and step S103 are the same as the steps shown in FIG. 2. At step S301, the program analyzing unit 2 determines whether the read command is a spindle rotating command. If the read command is the spindle rotating command (Yes at step S301), the program analyzing unit 2 proceeds to step S105. If the read command is not the spindle rotating command (No at step S301), the program analyzing unit 2 ends the processing. Step S105, step S106, and step S107 are the same as the steps shown in FIG. 2. At step S302, the program analyzing unit 2 determines whether the read command is a cutting command. If the read command is not the cutting command (No at step S302), the program analyzing unit 2 proceeds to step S109. If the read command is the cutting command (Yes at step S302), the program analyzing unit 2 ends the processing. Step S109 and step S110 are the same as the steps shown in FIG. 2.

Figure 7:
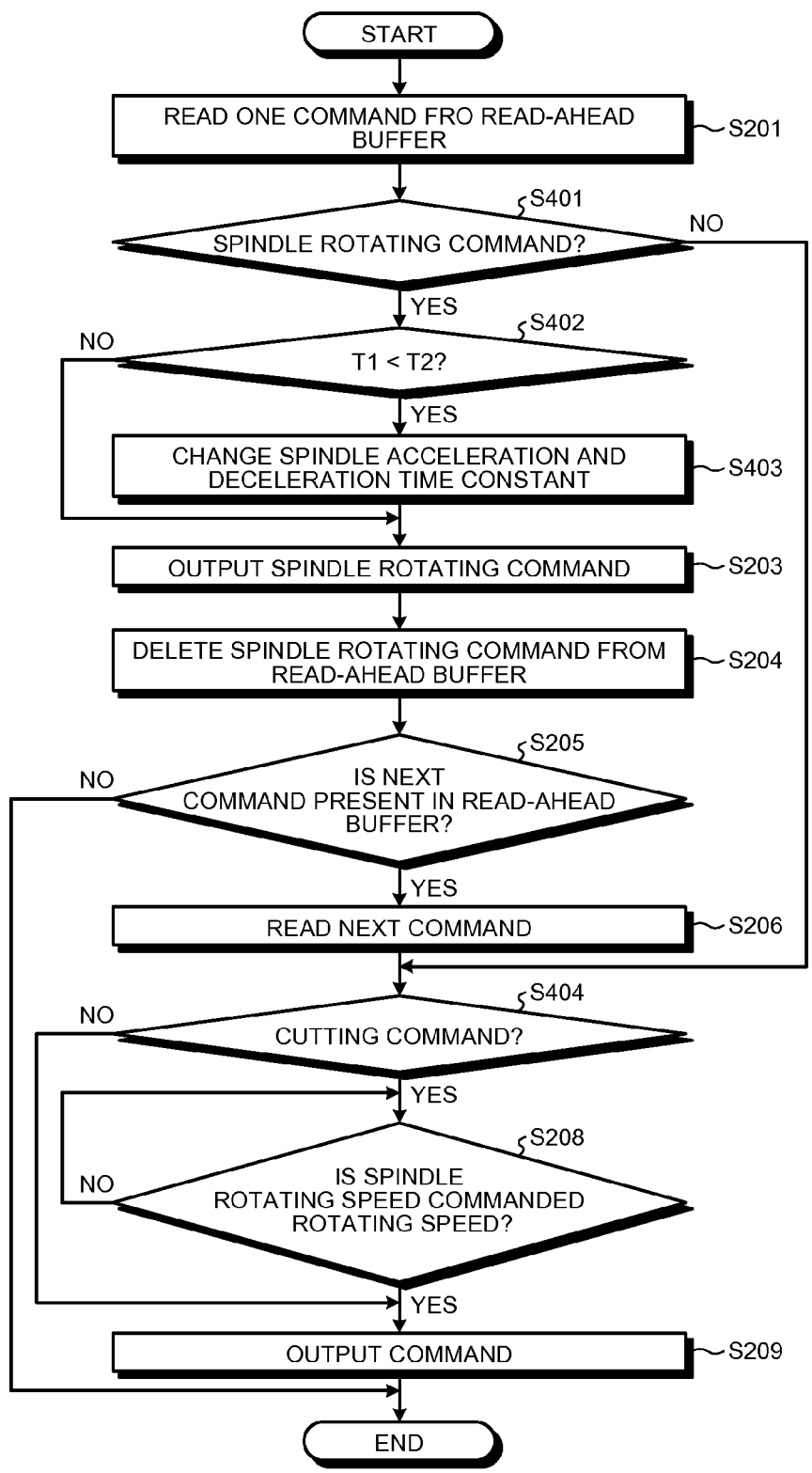
FIG. 7 is a flowchart illustrating a processing procedure executed by a command determining unit of the numerical control device according to the second embodiment.

FIG. 7 is a flowchart illustrating a processing procedure executed by the command determining unit 3 of the numerical control device 1 according to the embodiment. The flowchart of FIG. 7 is basically the same as the flowchart of FIG. 3 explained above. Therefore, differences therebetween are chiefly explained. Step S201 is the same as the step shown in FIG. 3. At step S401, the command determining unit 3 determines whether the read command is the spindle rotating command. If the read command is the spindle rotating command (Yes at step S401), the command determining unit 3 proceeds to step S402. If the read command is not the spindle rotating command (No at step S401), the command determining unit 3 proceeds to step S404. At step S402, the command determining unit 3 compares the spindle acceleration and deceleration time T1 with the time T2 from the spindle control command. If the command determining unit 3 determines that the spindle acceleration and deceleration time T1 is larger (No at step S402), the command determining unit 3 proceeds to step S203. If the command determining unit 3 determines that the time T2 from the spindle control command is larger (Yes at step S402), the command determining unit 3 proceeds to step S403. At step S403, the command determining unit 3 changes an acceleration and deceleration time constant of a spindle such that the spindle acceleration and deceleration time is equal to the time T2 from the spindle control command and proceeds to step S203. Step S203, step S204, step S205, and step S206 are the same as the steps shown in FIG. 3. At step S404, the command determining unit 3 determines whether the read command is a cutting command. If the read command is the cutting command (Yes at step S404), the command determining unit 3 proceeds to step S208. If the read command is not the cutting command (No at step S404), the command determining unit 3 proceeds to step S209. Step S208 and step S209 are the same as the steps shown in FIG. 3.

A flow of processing in the numerical control device 1 is specifically explained according to the flowcharts of FIG. 6 and FIG. 7 using a machining program example. FIG. 8 is a diagram illustrating the machining program example processed by the numerical control device 1 in the embodiment. First, at step S101, the program analyzing unit 2 confirms that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N201. Because the block of N201 is a tool replacing command (No at step S301), the program analyzing unit 2 ends the processing. In this case, a command of N201 is stored in the read-ahead buffer 7.

At step S201, the command determining unit 3 reads the command of N201 stored in the read-ahead buffer 7. Because the command of N201 is the tool replacing command (No at step S401), the command determining unit 3 proceeds to step S404: No and step S209, outputs the tool replacing command, and ends the processing.

When the operation of the tool replacing command of N201 is completed, at step S101, the program analyzing unit 2 confirms that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N202. Because the block of N202 is a positioning command (No at step S301), the program analyzing unit 2 ends the processing. In this case, a command of N202 is stored in the read-ahead buffer 7.

At step S201, the command determining unit 3 reads the command of N202 stored in the read-ahead buffer 7. Because the command of N202 is the positioning command (No at step S401), the command determining unit 3 proceeds to step S404: No and step S209, outputs the positioning command, and ends the processing.

The next block of N203 is also the positioning command. Therefore, the program analyzing unit 2 and the command determining unit 3 perform processing that is the same as the processing for the block of N202.

When the operation of the positioning command of N203 is completed, at step S101, the program analyzing unit 2 confirms that a command is not stored in the read-ahead buffer 7 (No at step S101). At step S102, the program analyzing unit 2 clears and sets the spindle acceleration and deceleration time T1 and the time T2 from the spindle control command to 0. At step S103, the program analyzing unit 2 reads a block of N204. Because the block of N204 is a spindle rotating command (Yes at step S301), the program analyzing unit 2 proceeds to step S105, calculates the spindle acceleration and deceleration time T1, and proceeds to step S106. At step S106, the program analyzing unit 2 confirms that the next block is present (Yes at step S106). At step S107, the program analyzing unit 2 reads a block of N205, which is the next block. Because the block of N205 is a positioning command (No at step S302), the program analyzing unit 2 proceeds to step S109 and calculates an execution time of the block of N205. At step S110, the program analyzing unit 2 updates the time T2 from the spindle control command and returns to step S106.

At step S106, the program analyzing unit 2 confirms that the next block is present (Yes at step S106). At step S107, the program analyzing unit 2 reads a block of N206, which is the next block. Because the block of N206 is also the positioning command, the program analyzing unit 2 processes the block of N206 in the same manner as the block of N205. Because a block of N207 is also the positioning command, the program analyzing unit 2 processes the block in the same manner.

At step S106, the program analyzing unit 2 confirms that the next block is present (Yes at step S106). At step S107, the program analyzing unit 2 reads a block of N208, which is the next block. Because the block of N208 is a cutting command (Yes at step S302), the program analyzing unit 2 ends the processing. In this case, commands of N204, N205, N206, N207, and N208 are stored in the read-ahead buffer 7.

At step S201, the command determining unit 3 reads the command of N204 stored in the read-ahead buffer 7. Because the command of N204 is a spindle rotating command (Yes at step S401), the command determining unit 3 proceeds to step S402. At step S402, the command determining unit 3 compares the spindle acceleration and deceleration time T1 with the time T2 from the spindle control command. If the command determining unit 3 determines that the time T2 from the spindle control command is larger (Yes at step S402), the command determining unit 3 proceeds to step S403. At step S403, the command determining unit 3 changes the acceleration and deceleration time constant of the spindle, proceeds to step S203 and step S204, outputs a spindle rotating command, and deletes the spindle rotating command from the read-ahead buffer 7. At step S205, the command determining unit 3 confirms that the next command is present in the read-ahead buffer 7 (Yes at step S205). At step S206, the command determining unit 3 reads the command of N205. Because the command of N205 is a positioning command (No at step S404), the command determining unit 3 proceeds to step S209, outputs the positioning command, and ends the processing.

When the operation of the positioning command of N205 is completed, at step S101, because a command is still stored in the read-ahead buffer 7 (Yes at step S101), the program analyzing unit 2 ends the processing.

At step S201, the command determining unit 3 reads the command of N206 stored in the read-ahead buffer 7. Because the command of N206 is a positioning command (No at step S401), the command determining unit 3 proceeds to step S404: No and step S209, outputs the positioning command, and ends the processing. The block of N207 is processed in the same manner as the block of N206.

When the operation of the positioning command of N207 is completed, a command is still stored in the read-ahead buffer 7 at step S101 (Yes at step S101) so that the program analyzing unit 2 ends the processing.

At step S201, the command determining unit 3 reads the command of N208 stored in the read-ahead buffer 7. Because the command of N208 is a cutting command (No at step S401), the command determining unit 3 proceeds to step S404: Yes, step S208: Yes, and step S209, confirms that the actual spindle rotating speed 14 is the commanded rotating speed, outputs the cutting command, and ends the processing.

FIG. 9 is a time chart for the machining program example shown in FIG. 8. FIG. 9(1) shows the conventional operation. FIG. 9(2) shows the operation in the embodiment. In the conventional operation, the actual spindle rotating speed 14 is changed to the commanded rotating speed by the time (T2) from the spindle rotating command to the cutting command. Therefore, if the spindle acceleration and deceleration time (T1) is extremely short compared with the time (T2) from the spindle rotating command to the cutting command, power consumption is wasted by a useless acceleration operation. In the embodiment, if the time (T2) from the spindle rotating command to the cutting command is longer than the spindle acceleration and deceleration time (T1), the spindle acceleration and deceleration time (T1) is increased to match the cutting command. Due to this configuration, it is possible to reduce the power consumption without changing a machining time.

As explained above, according to the embodiment, in the numerical control device 1, if there is a margin in time necessary until the spindle rotating speed reaches the commanded rotating speed, the spindle acceleration and deceleration time is increased. Consequently, in addition to the effects in the first embodiment, it is possible to reduce power consumption.

Third Embodiment

Figure 10:
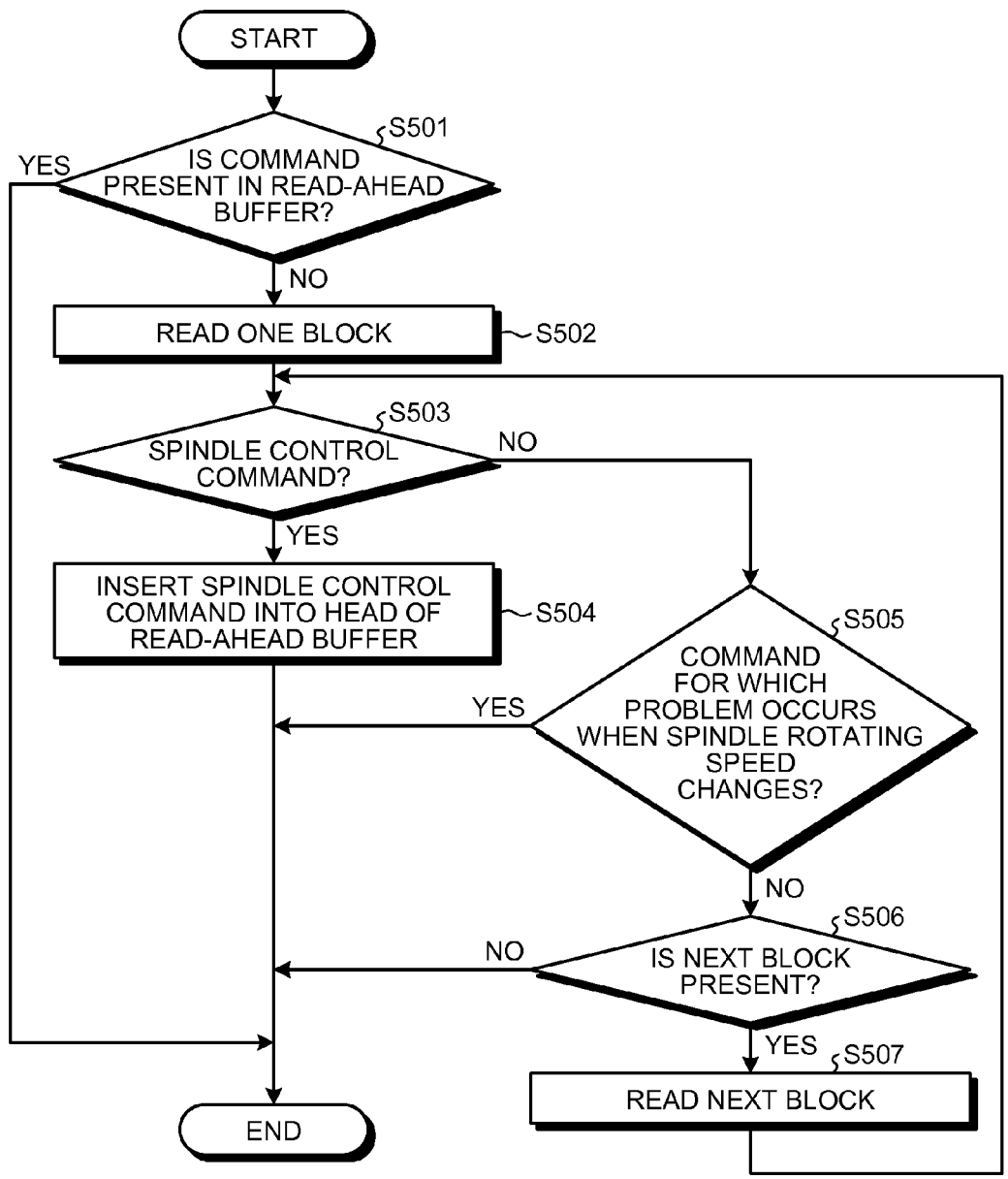
FIG. 10 is a flowchart illustrating a processing procedure executed by a program analyzing unit of a numerical control device according to a third embodiment.

FIG. 10 is a flowchart illustrating a processing procedure executed by the program analyzing unit 2 of the numerical control device 1 according to the embodiment. At step S501, the program analyzing unit 2 determines whether a command is stored in the read-ahead buffer 7. If a command is stored in the read-ahead buffer 7 (Yes at step S501), the program analyzing unit 2 ends the processing. If a command is not stored in the read-ahead buffer 7 (No at step S501), the program analyzing unit 2 proceeds to step S502. At step S502, the program analyzing unit 2 reads the machining program 6 and proceeds to step S503. At step S503, the program analyzing unit 2 determines whether the read command is the spindle control command 12. If the read command is the spindle control command 12 (Yes at step S503), the program analyzing unit 2 proceeds to step S504. If the read command is not the spindle control command 12 (No at step S503), the program analyzing unit 2 proceeds to step S505. At step S504, the program analyzing unit 2 stores the spindle control command 12 at the head of the read-ahead buffer 7. At step S505, the program analyzing unit 2 determines whether the read command is a command for which a problem occurs when the spindle rotating speed changes. If the read command is a command for which a problem does not occur (No at step S505), the program analyzing unit 2 proceeds to step S506. If the read command is the command for which a problem occurs (Yes at step S505), the program analyzing unit 2 ends the processing. At step S506, the program analyzing unit 2 determines whether the next block is present. If the next block is present (Yes at step S506), the program analyzing unit 2 proceeds to step S507. If the next block is absent (No at step S506), the program analyzing unit 2 ends the processing. At step S507, the program analyzing unit 2 reads the next block and returns to step S503. Pieces of information concerning the blocks read by the program analyzing unit 2 are sequentially stored in the read-ahead buffer 7.

Note that a flowchart for explaining a processing procedure executed by the command determining unit 3 of the numerical control device 1 according to the embodiment is the same as the flowchart for the first embodiment (see FIG. 3).

A flow of processing in the numerical control device 1 is specifically explained by using a machining program (see FIG. 4) in the first embodiment according to the flowcharts of FIG. 10 and FIG. 3. First, at step S501, the program analyzing unit 2 confirms that a command is not stored in the read-ahead buffer 7 (No at step S501). At step S502, the program analyzing unit 2 reads a block of N101. Because the block of N101 is a cutting command (No at step S503), the program analyzing unit 2 ends the processing. In this case, a command of N101 is stored in the read-ahead buffer 7.

At step S201, the command determining unit 3 reads the command of N101 stored in the read-ahead buffer 7. Because the command of N101 is the cutting command (No at step S202), the command determining unit 3 proceeds to step S207: Yes, step S208: Yes, and step S209, outputs the cutting command, and ends the processing.

When the operation of the cutting command of N101 is completed, at step S501, the program analyzing unit 2 confirms that a command is not stored in the read-ahead buffer 7 (No at step S501). At step S502, the program analyzing unit 2 reads a block of N102. Because the block of N102 is a positioning command (No at step S503), the program analyzing unit 2 proceeds to step S505: No. At step S506, the program analyzing unit 2 confirms that the next block is present (Yes at step S506). At step S507, the program analyzing unit 2 reads a block of N103, which is the next block. Because the block of N103 is a spindle stopping command (Yes at step S503), the program analyzing unit 2 proceeds to step S504, inserts the spindle stopping command into the head of the read-ahead buffer 7, and ends the processing. In this case, commands are stored in the read-ahead buffer 7 in the order of N103 and N102.

At step S201, the command determining unit 3 reads the command of N103 stored in the read-ahead buffer 7. Because the command of N103 is a spindle stopping command (Yes at step S202), the command determining unit 3 proceeds to step S203 and step S204, outputs the spindle stopping command, and deletes the spindle stopping command from the read-ahead buffer 7. At step S205, the command determining unit 3 confirms that the next command is present in the read-ahead buffer 7 (Yes at step S205). At step S206, the command determining unit 3 reads the command of N102. Because the command of N102 is a positioning command (No at step S207), the command determining unit 3 proceeds to step S209, outputs the positioning command, and ends the processing.

When the operation of the positioning command of N102 ends, at step S501, the program analyzing unit 2 confirms that a command is not stored in the read-ahead buffer 7 (No at step S501). At step S502, the program analyzing unit 2 reads a block of N104. Because the block of N104 is a positioning command (No at step S503), the program analyzing unit 2 proceeds to step S505: No. At step S506, the program analyzing unit 2 confirms that the next block is present (Yes at step S506). At step S507, the program analyzing unit 2 reads a block of N105, which is the next block. Because the block of N105 is a tool replacing command (No at step S503), the program analyzing unit 2 proceeds to step S505: Yes and ends the processing. In this case, commands of N104 and N105 are stored in the read-ahead buffer 7.

At step S201, the command determining unit 3 reads the command of N104 stored in the read-ahead buffer 7. Because the command of N104 is a positioning command (No at step S202), the command determining unit 3 proceeds to step S207: No and step S209, outputs a positioning command, and ends the processing. When the operation of the positioning command of N104 is completed, at step S201, the command determining unit 3 reads the command of N105 stored in the read-ahead buffer 7. Because the command of N105 is a tool replacing command (No at step S202), the command determining unit 3 proceeds to step S207: Yes, step S208: Yes, and step S209, waits for the actual spindle rotating speed 14 to reach the commanded rotating speed, that is, zero speed, outputs the tool replacing command, and ends the processing.

When the operation of the tool replacing command of N105 is completed, the program analyzing unit 2 confirms at step S501 that a command is not stored in the read-ahead buffer 7 (No at step S501). At step S502, the program analyzing unit 2 reads a block of N106. Because the block of N106 is a positioning command (No at step S503), the program analyzing unit 2 proceeds to step S505: No. At step S506, the program analyzing unit 2 confirms that the next block is present (Yes at step S506). At step S507, the program analyzing unit 2 reads a block of N107, which is the next block. Because the block of N107 is a positioning command (No at step S503), the program analyzing unit 2 proceeds to step S505: No. At step S506, the program analyzing unit 2 confirms that the next block is present. At step S507, the program analyzing unit 2 reads a block of N108, which is the next block. Because the block of N108 is a spindle rotating command, the program analyzing unit 2 proceeds to step S503 (Yes at step S503) and step S504, inserts the spindle rotating command into the head of the read-ahead buffer 7, and ends the processing. In this case, in the read-ahead buffer 7, commands are stored in the order of N108, N106, and N107.

At step S201, the command determining unit 3 reads the command of N108 stored in the read-ahead buffer 7. Because the command of N108 is a spindle rotating command (Yes at step S202), the command determining unit 3 proceeds to step S203 and step S204, outputs the spindle rotating command, and deletes the spindle rotating command from the read-ahead buffer 7. At step S205, the command determining unit 3 confirms that the next command is present in the read-ahead buffer 7 (Yes at step S205). At step S206, the command determining unit 3 reads the command of N106. Because the command of N106 is a positioning command (No at step S207), the command determining unit 3 proceeds to step S209, outputs the positioning command, and ends the processing. When the operation of the positioning command of N106 is completed, at step S201, the command determining unit 3 reads the command of N107 stored in the read-ahead buffer 7. Because the command of N107 is a positioning command (No at step S202), the command determining unit 3 proceeds to step S207: No and step S209, outputs the positioning command, and ends the processing.

When the operation of the positioning command of N107 is completed, the program analyzing unit 2 confirms that a command is not stored in the read-ahead buffer 7 at step S501 (No at step S501). At step S502, the program analyzing unit 2 reads a block of N109. Because the block of N109 is a positioning command (No at step S503), the program analyzing unit 2 proceeds to step S505: No. At step S506, the program analyzing unit 2 confirms that the next block is present (Yes at step S506). At step S507, the program analyzing unit 2 reads a block of the N110, which is the next block. Because the block of N110 is a positioning command (No at step S503), the program analyzing unit 2 proceeds to step S505: No. At step S506, the program analyzing unit 2 confirms that the next block is present (Yes at step S506). At step S507, the program analyzing unit 2 reads a block of N111, which is the next block. Because the block of N111 is a cutting command (No at step S503), the program analyzing unit 2 proceeds to step S505: Yes and ends the processing. In this case, in the read-ahead buffer 7, commands of N109, N110, and N111 are stored.

At step S201, the command determining unit 3 reads the command of N109 stored in the read-ahead buffer 7. Because the command of N109 is a positioning command (No at step S202), the command determining unit 3 proceeds to step S207: No and step S209, outputs the positioning command, and ends the processing. When the operation of the positioning command of N109 is completed, at step S201, the command determining unit 3 reads the command of N110 stored in the read-ahead buffer 7. Because the command of N110 is a positioning command (No at step S202), the command determining unit 3 proceeds to step S207: No and step S209, outputs the positioning command, and ends the processing. When the operation of the positioning command of N110 is completed, at step S201, the command determining unit 3 reads the command of N111 stored in the read-ahead buffer 7. Because the command of N111 is a cutting command (No at step S202), the command determining unit 3 proceeds to step S207: Yes, step S208: Yes, and step S209, waits for the actual spindle rotating speed 14 to reach the commanded rotating speed, outputs the cutting command, and ends the processing.

FIG. 11 is a time chart for the machining program example shown in FIG. 4. FIG. 11(1) illustrates the conventional operation. FIG. 11(2) illustrates an operation in the embodiment. In the conventional operation, it is determined according to a ladder whether the spindle rotating speed reaches the commanded rotating speed and the operation proceeds to the next block. If the spindle rotating speed reaches the commanded rotating speed and the operation proceeds to the next block, as shown in FIG. 11(1), the positioning commands of N104 and N109 are executed after the spindle rotating speed reaches the commanded rotating speed. On the other hand, in the operation in the embodiment, as shown in FIG. 11(2), the positioning commands of N104 and N109 are executed without depending on the ladder even if the spindle rotating speed does not reach the commanded rotating speed. The tool replacing command of N105 and the cutting command of N111 are executed after the spindle rotating speed reaches the commanded rotating speed. Therefore, it is possible to reduce a machining time even if a complicated ladder is not made. Further, the spindle stopping command of N103 is output if the cutting command in N101 is completed. Therefore, it is possible to reduce a waiting time until the tool replacing command of N105 is executed.

Note that, as a command other than the tool replacing command and the cutting command, a command prior to the spindle control command can also be set as a first-out prohibition command in advance. In this case, the command determining unit 3 determines whether a command prior to the spindle control command is a command set as the first-out prohibition command in advance. If the command prior to the spindle control command is other than the first-out prohibition command, the command determining unit 3 outputs the spindle control command earlier than timing designated by the machining program 6.

As explained above, according to the embodiment, in the numerical control device 1, in the case of a command other than the command for which a problem occurs when the spindle rotating speed changes, the spindle control command is output earlier than the timing designated by the machining program. Consequently, it is possible to reduce a machining time without making a complicated ladder and without affecting machining and a machine.

Fourth Embodiment

Figure 12:
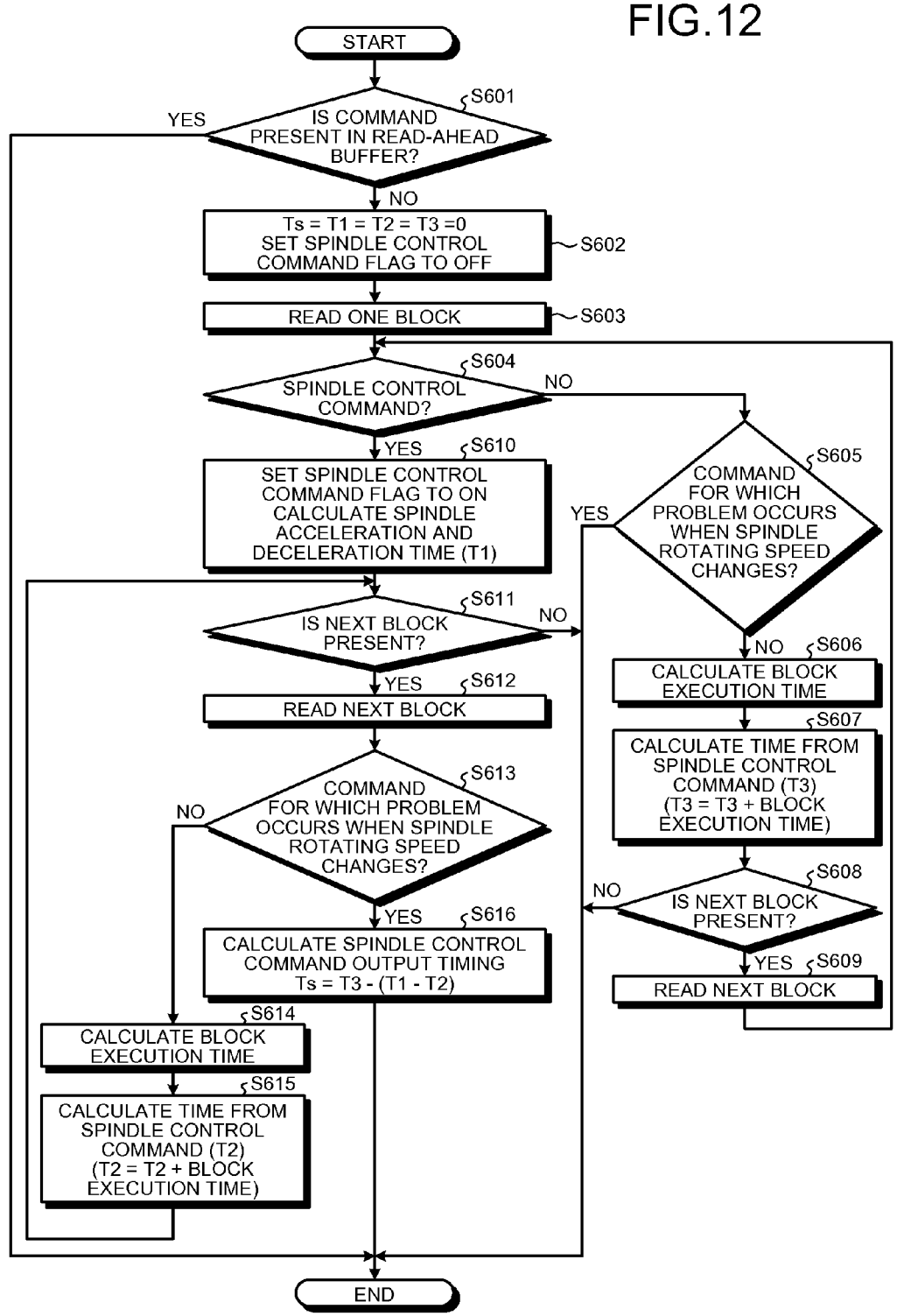
FIG. 12 is a flowchart illustrating a processing procedure executed by a program analyzing unit in a numerical control device according to a fourth embodiment.

FIG. 12 is a flowchart illustrating a processing procedure executed by the program analyzing unit 2 of the numerical control device 1 according to the embodiment. At step S601, the program analyzing unit 2 determines whether a command is stored in the read-ahead buffer 7. If a command is stored in the read-ahead buffer 7 (Yes at step S601), the program analyzing unit 2 ends the processing. If a command is not stored in the read-ahead buffer 7 (No at step S601), the program analyzing unit 2 proceeds to step S602. At step S602, the program analyzing unit 2 clears and sets the spindle acceleration and deceleration time T1, the time T2 from the spindle control command, a time T3 to the spindle control command, and a spindle control command output timing Ts to 0, sets a spindle control command flag to OFF, and proceeds to step S603. At step S603, the program analyzing unit 2 reads the machining program 6 and proceeds to step S604. At step S604, the program analyzing unit 2 determines whether the read command is the spindle rotating command. If the read command is not the spindle rotating command (No at step S604), the program analyzing unit 2 proceeds to step S605. If the read command is the spindle rotating command (Yes at step S604), the program analyzing unit 2 proceeds to step S610. At step S605, the program analyzing unit 2 determines whether the read command is a command for which a problem occurs when the spindle rotating speed changes. If the read command is the command for which a problem occurs (Yes at step S605), the program analyzing unit 2 ends the processing. If the read command is not the command for which a problem occurs (No at step S605), the program analyzing unit 2 proceeds to step S606. At step S606, the program analyzing unit 2 calculates an execution time of the read command and proceeds to step S607. At step S607, the program analyzing unit 2 accumulates execution times calculated at step S606 to calculate the time T3 to the spindle control command and proceeds to step S608. At step S608, the program analyzing unit 2 determines whether the next block is present. If the next block is present (Yes at step S608), the program analyzing unit 2 proceeds to step S609. If the next block is absent (No at step S608), the program analyzing unit 2 ends the processing. At step S609, the program analyzing unit 2 reads the next block and returns to step S604.

At step S610, the program analyzing unit 2 sets the spindle control command flag to ON, calculates the spindle acceleration and deceleration time T1, and proceeds to step S611. At step S611, the program analyzing unit 2 determines whether the next block is present. If the next block is present (Yes at step S611), the program analyzing unit 2 proceeds to step S612. If the next block is absent (No at step S611), the program analyzing unit 2 ends the processing. At step S612, the program analyzing unit 2 reads the next block and proceeds to step S613. At step S613, the program analyzing unit 2 determines that the read block is a command for which a problem occurs when the spindle rotating speed changes. If the read block is the command for which a problem occurs when the spindle rotating speed changes (Yes at step S613), the program analyzing unit 2 proceeds to step S616. If the read block is not the command for which a problem occurs (No at step S613), the program analyzing unit 2 proceeds to step S614. At step S614, the program analyzing unit 2 calculates an execution time of the read command and proceeds to step S615. At step S615, the program analyzing unit 2 accumulates execution times calculated at step S614 to calculate the time T2 from the spindle control command, and returns to step S611. At step S616, the program analyzing unit 2 calculates spindle control command output timing Ts from the spindle acceleration and deceleration time T1, the time T2 from the spindle control command, and the time T3 to the spindle control command (Ts=T3−(T1−T2)) and ends the processing. Information concerning the blocks read by the program analyzing unit 2 and the execution times calculated by the program analyzing unit 2 are sequentially stored in the read-ahead buffer 7.

Figure 13:
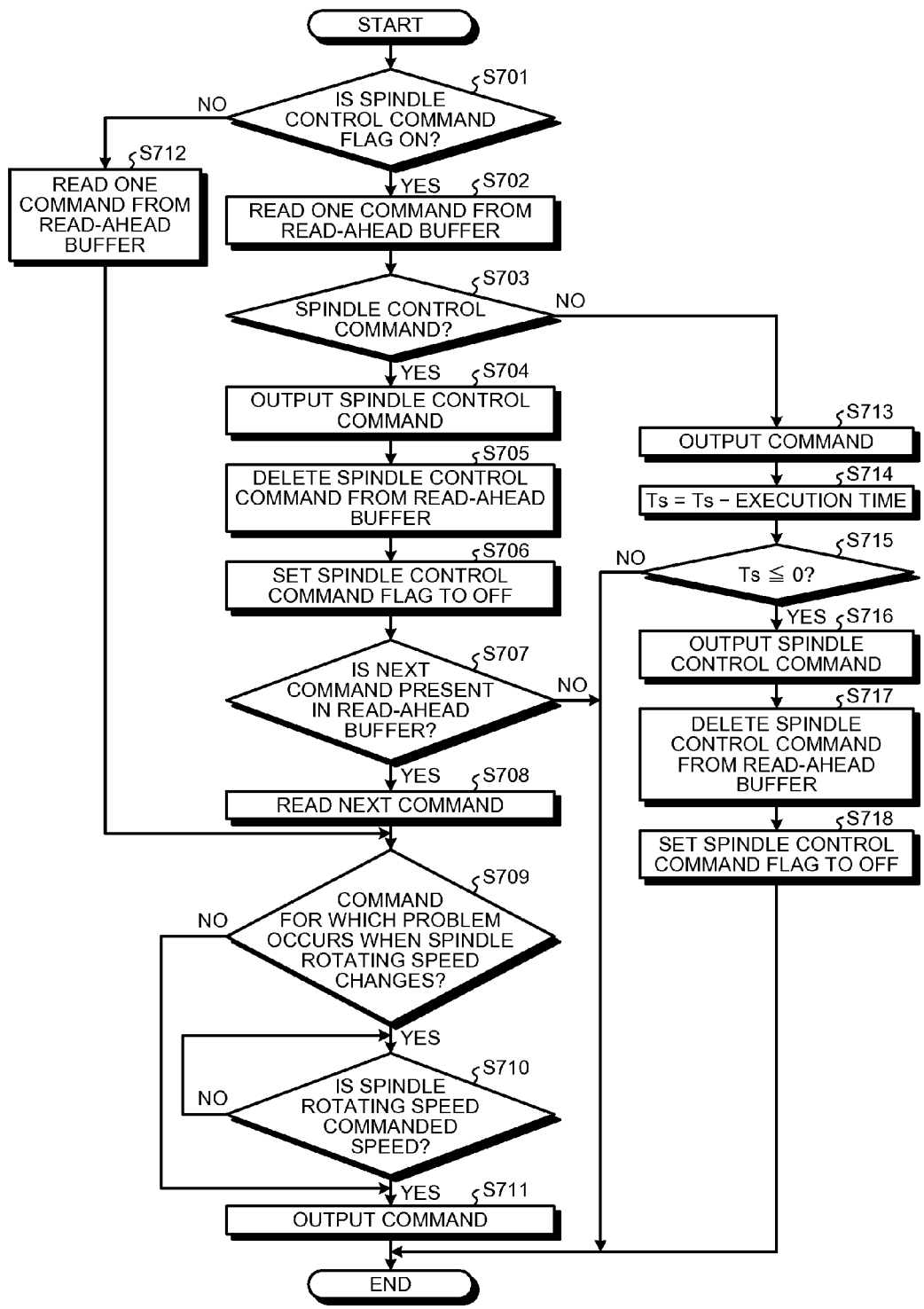
FIG. 13 is a flowchart illustrating a processing procedure executed by a command determining unit of the numerical control device according to the fourth embodiment.

FIG. 13 is a flowchart illustrating a processing procedure executed by the command determining unit 3 of the numerical control device 1 according to the embodiment. The command determining unit 3 sequentially performs processing on the basis of the information concerning the commands analyzed by the program analyzing unit 2 and stored in the read-ahead buffer 7. At step S701, the command determining unit 3 determines whether the spindle control command flag is ON. If the spindle control command flag is ON (Yes at step S701), the command determining unit 3 proceeds to step S702. If the spindle control command flag is OFF (No at step S701), the command determining unit 3 proceeds to step S712. At step S702, the command determining unit 3 reads one command from the read-ahead buffer 7 and proceeds to step S703. At step S703, the command determining unit 3 determines whether the read command is a spindle rotating command. If the read command is the spindle rotating command (Yes at step S703), the command determining unit 3 proceeds to step S704. If the read command is not the spindle rotating command (No at step S703), the command determining unit 3 proceeds to step S713. At step S704, the command determining unit 3 outputs the spindle rotating command and proceeds to step S705. At step S705, the command determining unit 3 deletes the spindle rotating command from the read-ahead buffer 7 and proceeds to step S706. At step S706, the command determining unit 3 sets the spindle control command flag to OFF and proceeds to step S707. At step S707, the command determining unit 3 determines whether the next command is stored in the read-ahead buffer 7. If the next command is stored in the read-ahead buffer 7 (Yes at step S707), the command determining unit 3 proceeds to step S708. If the next command is not stored in the read-ahead buffer 7 (No at step S707), the command determining unit 3 ends the processing. At step S708, the command determining unit 3 reads the next command from the read-ahead buffer 7 and proceeds to step S709. At step S709, the command determining unit 3 determines whether the read command is a command for which a problem occurs when the spindle rotating speed changes. If the read command is the command for which a problem occurs (Yes at step S709), the command determining unit 3 proceeds to step S710. If the read command is a command for which a problem does not occur (No at step S709), the command determining unit 3 proceeds to step S711. At step S710, the command determining unit 3 determines whether the actual spindle rotating speed 14 reaches the commanded rotating speed. If the actual spindle rotating speed 14 does not reach the commanded rotating speed (No at step S710), the command determining unit 3 waits for the actual spindle rotating speed 14 to reach the commanded rotating speed (Yes at step S710) and proceeds to step S711. At step S711, the command determining unit 3 outputs the read command and ends the processing. At step S712, the command determining unit 3 reads one command from the read-ahead buffer 7 and proceeds to step S709.

Then, at step S713, the command determining unit 3 outputs the read command and proceeds to step S714. At step S714, the command determining unit 3 subtracts an execution time of the read command from the spindle control command output timing Ts and proceeds to step S715. At step S715, the command determining unit 3 checks whether the spindle control command output timing Ts is equal to or smaller than 0. If the spindle control command output timing Ts is equal to or smaller than 0 (Yes at step S715), the command determining unit 3 proceeds to step S716. If the spindle control command output timing Ts is not equal to or smaller than 0 (No at step S715), the command determining unit 3 ends the processing. At step S716, the command determining unit 3 outputs the spindle rotating command and proceeds to step S717. At step S717, the command determining unit 3 deletes the spindle rotating command from the read-ahead buffer 7 and proceeds to step S718. At step S718, the command determining unit 3 sets the spindle control command flag to OFF and ends the processing.

Specifically by using a machining program example, a flow is explained of processing in the numerical control device 1 according to the flowcharts of FIG. 12 and FIG. 13. FIG. 14 is a diagram illustrating the machining program example processed by the numerical control device 1 in the embodiment. First, at step S601, the program analyzing unit 2 confirms that a command is not stored in the read-ahead buffer 7 (No at step S601). At step S602, the program analyzing unit 2 clears and sets the spindle acceleration and deceleration time T1, the time T2 from the spindle control command, the time T3 to the spindle control command, and the spindle control command output timing Ts to 0 and sets the spindle control command flag to OFF. At step S603, the program analyzing unit 2 reads a block of N301. Because the block of N301 is a tool replacing command (No at step S604), the program analyzing unit 2 proceeds to step S605: No, and step S606 and calculates a block execution time. At step S607, the program analyzing unit 2 calculates the time T3 to the spindle control command. At step S608, the program analyzing unit 2 confirms that the next block is present (Yes at step S608). At step S609, the program analyzing unit 2 reads a block of N302.

Because the block of N302 is a positioning command (No at step S604), as in the case of the block of N301, the program analyzing unit 2 proceeds to step S605: No, step S606, and step S607, calculates a block execution time of the block of N302, and updates the time T3 to the spindle control command. The program analyzing unit 2 proceeds to step S608: Yes and step S609 and reads a block of N303.

Because the block of N303 is also the positioning command (No at step S604), as in the case of the block of N302, the program analyzing unit 2 proceeds to step S605: No, step S606, and step S607, calculates a block execution time of the block of N303, and updates the time T3 to the spindle control command. The program analyzing unit 2 proceeds to step S608: Yes and step S609 and reads a block of N304.

Because the block of N304 is a spindle rotating command (Yes at step S604), the program analyzing unit 2 proceeds to step S610, turns on the spindle control command flag, and calculates the spindle acceleration and deceleration time T1. The program analyzing unit 2 proceeds to step S611: Yes and step S612 and reads a block of N305. Because the block of N305 is a positioning command (No at step S613), the program analyzing unit 2 proceeds to step S614 and calculates a block execution time. At step S615, the program analyzing unit 2 calculates the time T2 from the spindle control command.

The program analyzing unit 2 returns to step S611, proceeds to step S611: Yes and step S612, and reads a block of N306. Because the block of N306 is also the positioning command (No at step S613), as in the case of the block of N305, the program analyzing unit 2 proceeds to step S614 and calculates a block execution time. At step S615, the program analyzing unit 2 calculates the time T2 from the spindle control command.

The program analyzing unit 2 returns to step S611, proceeds to step S611: Yes and step S612, and reads a block of N307. Because the block of N307 is a cutting command (Yes at step S613), the program analyzing unit 2 proceeds to step S616, calculates the spindle control command output timing Ts, and ends the processing. In this case, commands N301 to N307 are stored in the read-ahead buffer 7. Block execution times are also stored with respect to the blocks N301 to N303, N305, and N306.

The command determining unit 3 sequentially processes the commands of N301 to N307 stored in the read-ahead buffer 7. First, at step S701, the command determining unit 3 checks whether the spindle control command flag is ON. Because the spindle control command flag is ON (Yes at step S701), the command determining unit 3 proceeds to step S702. At step S702, the command determining unit 3 reads the command of N301. Because the command of N301 is a tool replacing command (No at step S703), the command determining unit 3 proceeds to step S713 and outputs a command. At step S714, the command determining unit 3 subtracts the block execution time of N301 from the spindle control command output timing Ts. At step S715, the command determining unit 3 determines whether the spindle control command output timing Ts is equal to or smaller than 0. The command determining unit 3 determines that the spindle control command output timing Ts is not equal to or smaller than 0 at the present point (No at step S715) and ends the processing.

When the command of N301 is completed, the command determining unit 3 proceeds to step S701: Yes and step S702 and reads the command of N302. Because N302 is a positioning command (No at step S703), the command determining unit 3 proceeds to step S713 and outputs a command. At step S714, the command determining unit 3 subtracts the block execution time of N302 from the spindle control command output timing Ts. At step S715, the command determining unit 3 determines that the spindle control command output timing Ts is not equal to or smaller than 0 at the present point (No at step S715) and ends the processing.

When the command of N302 is completed, the command determining unit 3 proceeds to step S701: Yes and step S702 and reads the command of N303. Because N303 is a positioning command (No at step S703), the command determining unit 3 proceeds to step S713 and outputs a command. At step S714, the command determining unit 3 subtracts the block execution timing of N303 from the spindle control command output timing Ts. At step S715, the command determining unit 3 determines that the spindle control command output timing Ts is equal to or smaller than 0 at the present point (Yes at step S715), proceeds to step S716, outputs the spindle rotating command (N304), proceeds to step S717, deletes the spindle rotating command (N304) from the read-ahead buffer 7, proceeds to step S718, sets the spindle control command flag to OFF, and ends the processing.

When the command of N303 is completed, the command determining unit 3 proceeds to step S701: No and step S712 and reads the command of N305. Because the command of N305 is a positioning command (No at step S709), the command determining unit 3 proceeds to step S711, outputs a command, and ends the processing.

When the command of N305 is completed, the command determining unit 3 proceeds to step S701: No and step S712 and reads the command of N306. Because the command of N306 is a positioning command (No at step S709), the command determining unit 3 proceeds to step S711, outputs a command, and ends the processing.

When the command of N306 is completed, the command determining unit 3 proceeds to step S701: No and step S712 and reads the command of N307. Because the command of N307 is a cutting command, the command determining unit 3 proceeds to step S709: Yes and step S710 and waits for the actual spindle rotating speed 14 to reach the commanded rotating speed. If the actual spindle rotating speed 14 reaches the commanded rotating speed, the command determining unit 3 proceeds to step S711, outputs a command, and ends the processing.

FIG. 15 is a time chart for the machining program example shown in FIG. 14. FIG. 15(1) shows a conventional operation. FIG. 15(2) shows an operation in the embodiment. In the conventional operation, it is determined according to a ladder whether the spindle rotating speed reaches the commanded rotating speed and the operation proceeds to the next block. If it is configured that the spindle rotating speed reaches the commanded rotating speed and the operation proceeds to the next block, as shown in FIG. 15(1), the positioning commands of N305 and N306 are executed after the spindle rotating speed reaches the commanded rotating speed. The spindle rotating command of N304 is also output after the movement of N303 is completed. On the other hand, in the operation in the embodiment, as shown in FIG. 15(2), the positioning commands of N305 and N306 are executed without depending on the ladder even if the spindle rotating speed does not reach the commanded rotating speed. Note that the cutting command of N307 is executed after the spindle rotating speed reaches the commanded rotating speed. Therefore, it is possible to reduce a machining time even if a complicated ladder is not made. Further, the spindle rotating command of N304 is output such that the spindle rotating speed reaches the commanded rotating speed according to the timing when the cutting command of N307 is started. Therefore, it is possible to reduce a waiting time until the cutting command of N307 is executed.

As explained above, according to the embodiment, the numerical control device 1 outputs the spindle control command in advance and eliminates a waiting time until the spindle rotating speed reaches the commanded rotating speed in the case of the command for which a problem occurs when the spindle rotating speed changes. Consequently, it is possible to reduce a machining time.

Note that the numerical control device 1 is configurable to be provided with a display unit. On a screen of the display unit, information concerning a change of timing designated by the machining program can be output to the operator. FIG. 16 is a diagram illustrating an example of a display screen in the display unit provided in the numerical control device 1.

FIG. 16(1) is a diagram of a display example of a screen of the conventional numerical control device. On a screen 20, position information 21 such as a machine position, modal information 22 such as a state of the modal, machining information 23 such as cutting speed and spindle rotating speed, machining program information 24, and the like are displayed. When the spindle control command 12 is to be changed from a timing designated by the machining program and be output, the change of the timing of the output is notified to the operator from the screen 20 to allow the operator to learn the change of the timing of the output.

FIG. 16(2) is a diagram of a display example of a screen of the numerical control device in the embodiment. Shown is how the output timing of the spindle control command is changed. When the spindle control command 12 is changed from timing designated by the machining program and output, the machining program information 24 is divided into two. The original machining program is displayed on one of the divided two pieces of the machining program information 24. In this case, the spindle control command 12 to be changed is displayed thinner than the original display. On the other of the divided two pieces of the machining program information 24, the spindle control command 12 to be changed is displayed according to the timing of the output. In this way, the timing to be changed is notified from the screen. Consequently, the operator can grasp the operation of a machine and can work without undue worries.

REFERENCE SIGNS LIST

1 Numerical control device
2 Program analyzing unit
3 Command determining unit
4 Interpolating unit
5 Spindle-control-command output unit
6 Machining program
7 Read-ahead buffer
8 Servo amplifier
9 Spindle amplifier
10 Moving command
11 Movement amount
12 Spindle control command
13 Spindle rotating speed
14 Actual spindle rotating speed
20 Screen
21 Position information
22 Modal information 23 Machining information
24 Machining program information

The invention claimed is:

1. A numerical control device of a machine tool capable of controlling a spindle rotating speed of the machine tool, the numerical control device comprising:
   a program analyzing unit that
      reads ahead a machining program by one block or more and analyzes a command for the machine tool,
      determines whether the command is compatible with being executed concurrently with a spindle control command that causes a change in the spindle rotating speed, and
      calculates a first time period, a second time period, and a third time period, wherein
         the first time period is from when the spindle control command starts to when the spindle rotating speed reaches a designated rotating speed, which is a spindle acceleration or deceleration time,
         the second time period is an accumulated execution time period from a start of a second command, which is the command compatible with being executed concurrently with the spindle control command, to a start of a first command which is not compatible with being executed concurrently with the spindle control command, and
         the third time period is a time period which is an accumulated execution time period of the second command between a start of the second command to a start of the spindle control command, and
      calculates an output timing of the spindle control command by using the first time period, the second time period, and the third time period; and
   a command determining unit that outputs the spindle control command earlier than a timing designated by the machining program within a range of the spindle control command output timing,
   wherein the numerical control device controls the spindle rotating speed of the machine tool based on the spindle control command output by the command determining unit.

2. The numerical control device according to claim 1, wherein
   the program analyzing unit
      determines, if the spindle control command is a spindle rotating command, whether the command is prior to the spindle rotating command and is a cutting command or a tool replacing command, or whether the command is posterior to the spindle rotating command and is the cutting command,
      calculates
         the first time period,
         the second time period, after the spindle rotating command, from a start of the second command to a start of the cutting command, and
         the third time period, before the spindle rotating command, that is from an end of the cutting command or the tool replacement command which is a start of the second command to a start of the spindle rotating command, and
      calculates an output timing of the spindle control command, and
   the command determining unit outputs the spindle rotating command earlier than the timing designated by the machining program within a range of the spindle control command output timing.

3. The numerical control device according to claim 1, wherein
   the program analyzing unit
      determines, if the spindle control command is a spindle stopping command, whether the command is prior to a spindle stopping command and is a cutting command,
      determines whether the command is posterior to the spindle stopping command and is a tool replacing command, and
      calculates
         the first time period,
         the second time period, after the spindle stopping command, from a start of the second command to a start of the tool replacement command, and
         the third time period, before the spindle stopping command, that is from an end of the cutting command which is a start of the second command to a start of the spindle stopping command, and
      calculates an output timing of the spindle control command, and
   the command determining unit outputs the spindle stopping command earlier than the timing designated by the machining program within a range of the spindle control command outputting timing.

4. The numerical control device according to claim 1, further comprising
   a display unit that displays, when the spindle control command is output earlier than the timing designated by the machining program, an updated timing for outputting the spindle control command.

* * * * *